(12) United States Patent
Tzeng et al.

(10) Patent No.: US 6,869,710 B2
(45) Date of Patent: Mar. 22, 2005

(54) METAL AIR CELL SYSTEM

(75) Inventors: George Tzong-Chyi Tzeng, Elmsford, NY (US); Craig L. Cole, Bloomingburg, NY (US)

(73) Assignee: eVionyx, Inc., Hawthorne, NY (US)

( * ) Notice: Subject to any disclaimer, the term of this patent is extended or adjusted under 35 U.S.C. 154(b) by 203 days.

(21) Appl. No.: 10/074,893

(22) Filed: Feb. 11, 2002

(65) Prior Publication Data

US 2002/0160247 A1 Oct. 31, 2002

Related U.S. Application Data

(60) Provisional application No. 60/267,935, filed on Feb. 9, 2001, provisional application No. 60/267,819, filed on Feb. 9, 2001, provisional application No. 60/294,870, filed on May 31, 2001, provisional application No. 60/295,635, filed on Jun. 4, 2001, and provisional application No. 60/295,634, filed on Jun. 4, 2001.

(51) Int. Cl.[7] .............................................. H01M 4/00
(52) U.S. Cl. ............................. 429/28; 429/27; 429/80; 429/119; 429/208
(58) Field of Search ............................ 429/28, 118, 80, 429/208, 27, 237, 234, 244

(56) References Cited

U.S. PATENT DOCUMENTS

| | | | |
|---|---|---|---|
| 3,682,705 A | 8/1972 | Petix | 429/28 |
| 3,836,398 A | 9/1974 | Garcin et al. | 136/86 |
| 3,881,959 A * | 5/1975 | Tsuchida et al. | 429/27 |
| 4,626,482 A | 12/1986 | Hamlen et al. | 429/27 |
| 5,650,241 A | 7/1997 | McGee | 429/67 |
| 6,261,709 B1 * | 7/2001 | Passaniti et al. | 429/27 |

FOREIGN PATENT DOCUMENTS

| | | |
|---|---|---|
| EP | 940866 A2 | 9/1999 |
| GB | 1178144 | 1/1970 |
| GB | 1438203 | 6/1976 |
| JP | 10162870 | 6/1998 |

OTHER PUBLICATIONS

International Search Report, PCT/US02/04094, Sep. 30, 2003.

* cited by examiner

*Primary Examiner*—Laura Weiner
(74) *Attorney, Agent, or Firm*—Ralph J. Crispino, Esq.

(57) ABSTRACT

A metal air cell system is provided. The system includes a cathode having a pair of oxidant sides and anode sides. An anode is provided in two parts, each part having a side complementary each anode side of the cathode. A separator is disposed between the anode and cathode to electrically isolate the anode and the cathode. Electrolyte is disposed between the cathode and the anode, the electrolyte provided within the anode, separately at the interface between the cathode and the anode, or both within the anode and separately at the interface between the cathode and the anode. This configuration generally allows a single oxidant flow to be exposed to both portions of the cathode due to the central passage of the oxidant.

14 Claims, 15 Drawing Sheets

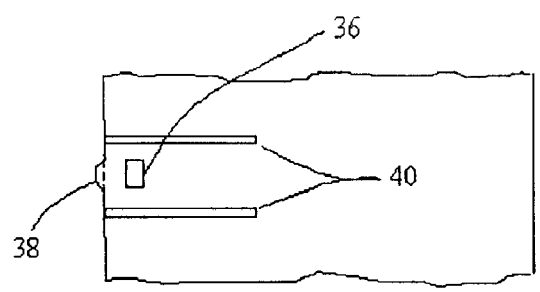
FIGURE 4B
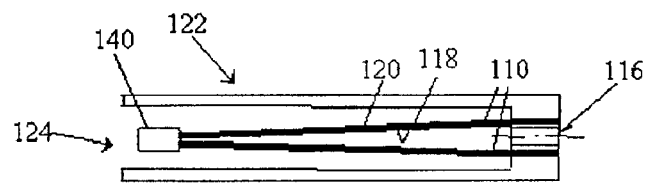
FIGURE 5
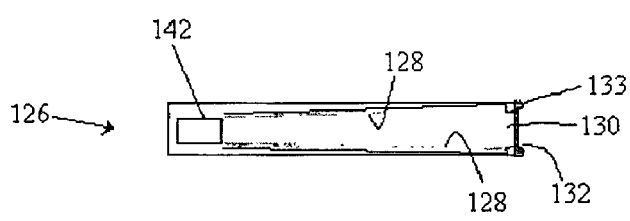 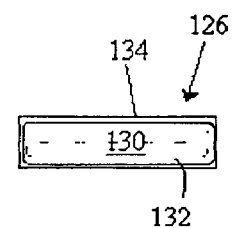
FIGURE 6A  FIGURE 6B
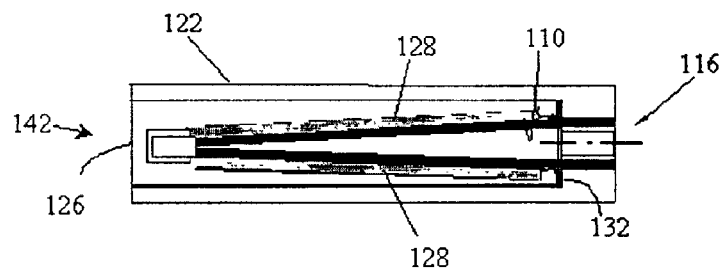
FIGURE 7

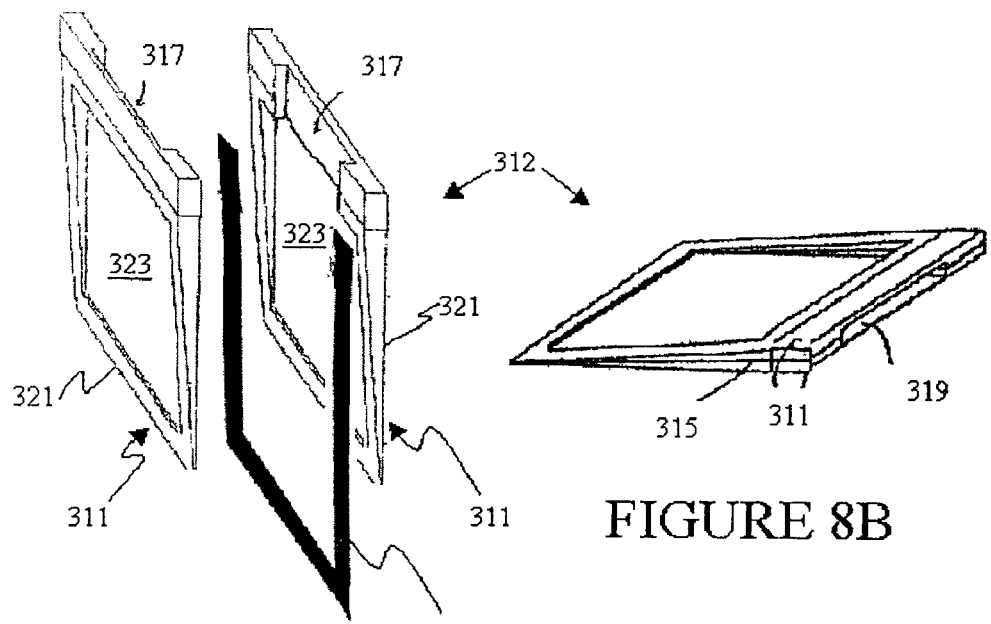
FIGURE 8A
FIGURE 8B
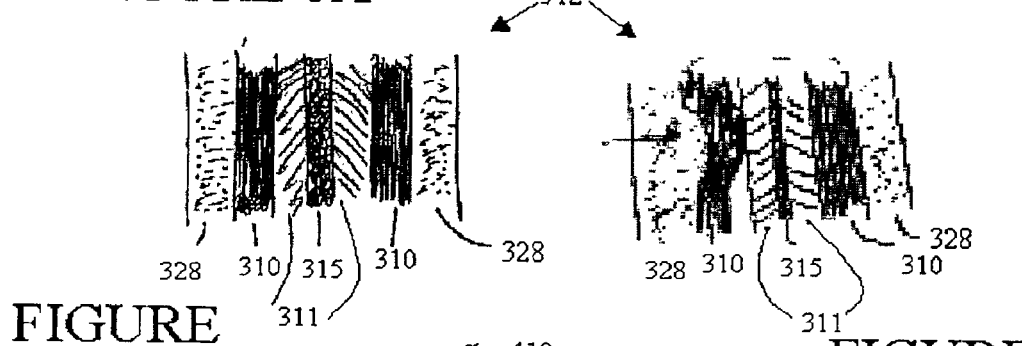
FIGURE 8C
FIGURE 8D
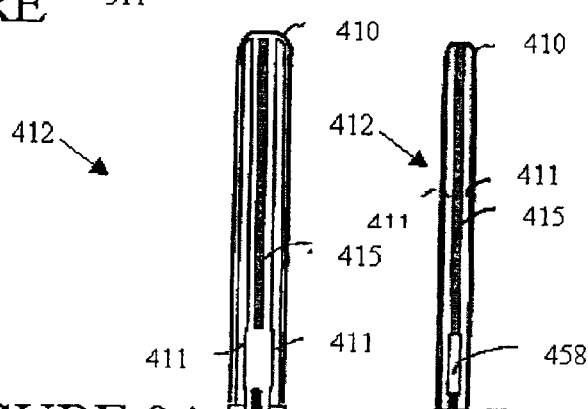
FIGURE 9A
FIGURE 9B

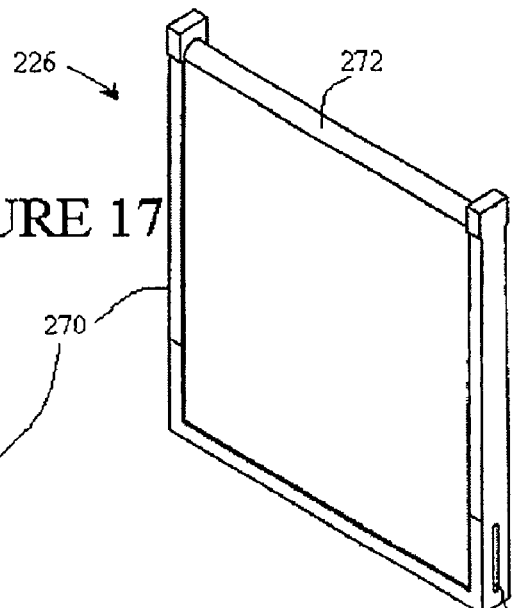
FIGURE 17
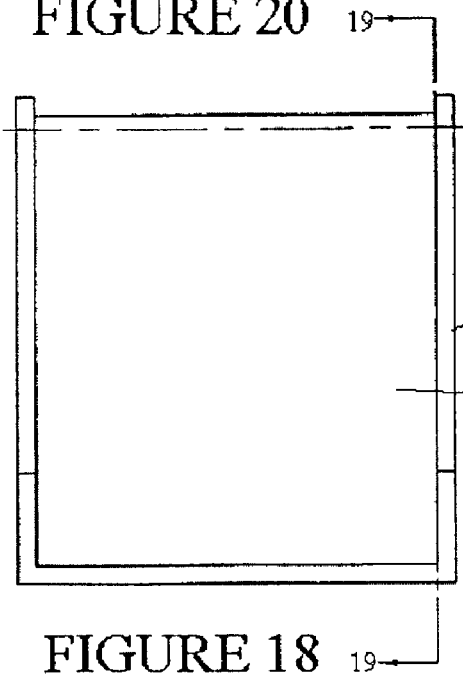
FIGURE 18
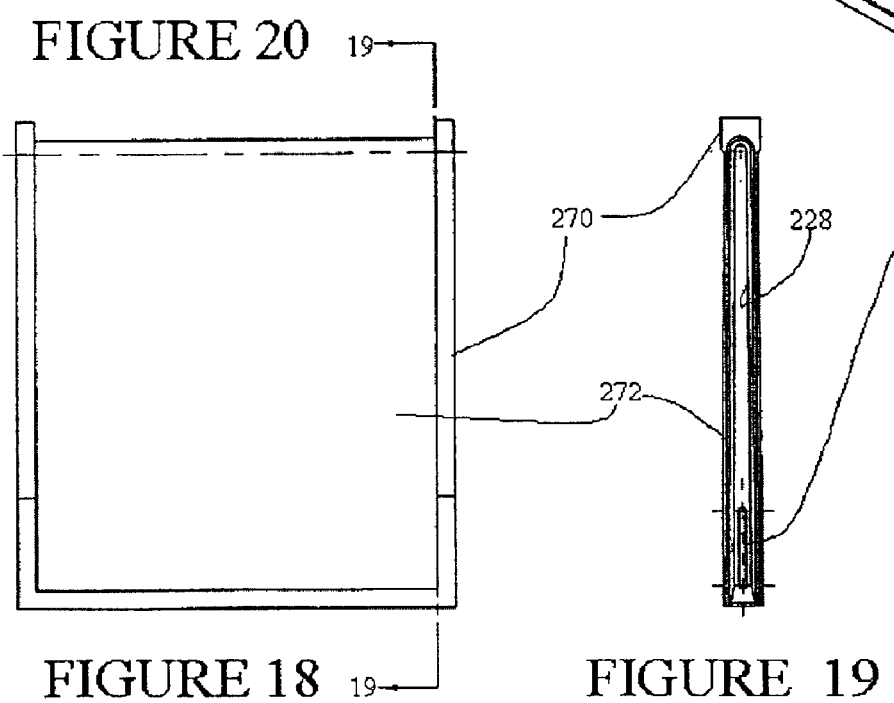
FIGURE 20
FIGURE 19
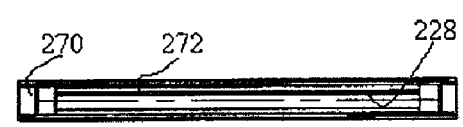
FIGURE 21

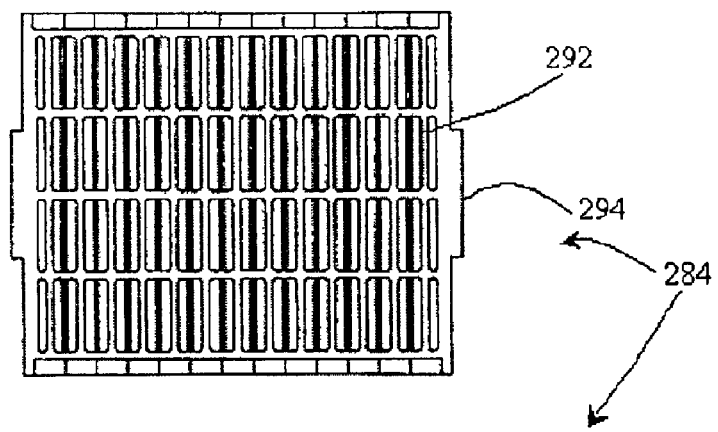
FIGURE 30
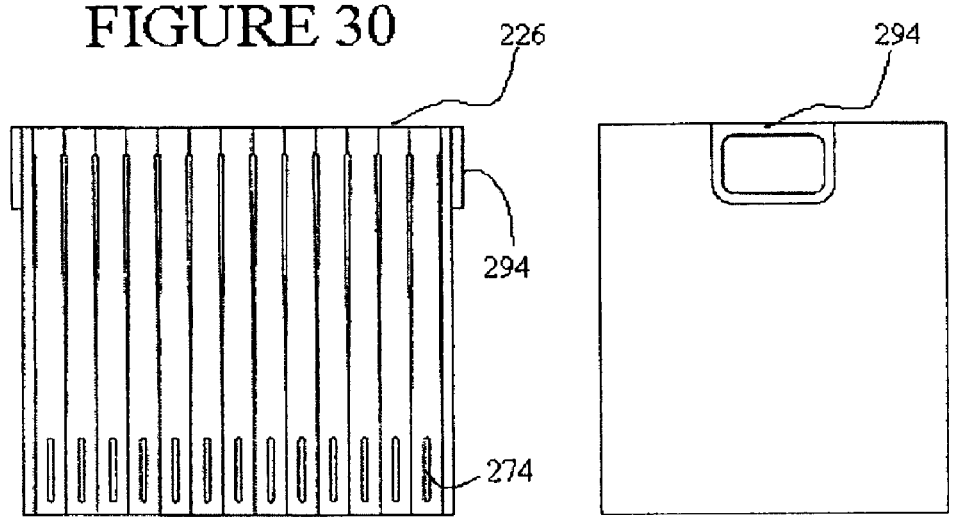
FIGURE 31                    FIGURE 33
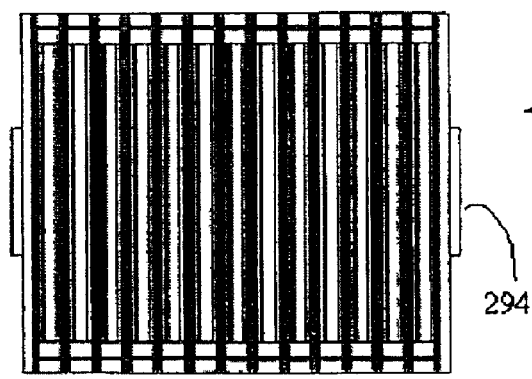
FIGURE 32

METAL AIR CELL SYSTEM

RELATED APPLICATIONS

This application claims priority to U.S. Provisional Application Ser. No. 60/267,935, filed Feb. 9, 2001 entitled "METAL AIR CELL"; U.S. Provisional Application Ser. No. 60/267,819, filed Feb. 9, 2001 entitled METAL AIR CELL INCORPORATING FLUID MANAGEMENT SYSTEM"; U.S. Provisional Application Ser. No. 60/294,870, filed May 31, 2001 entitled 'STRUCTURE FOR METAL AIR CELLS"; U.S. Provisional Application Ser. No. 60/295,635, filed Jun. 4, 2001 entitled "CONTACT ENHANCEMENT SYSTEM FOR METAL AIR ELECTROCHEMICAL CELLS"; and U.S. Provisional Application Ser. No. 60/295,634, filed Jun. 4, 2001 entitled "ANODE STRUCTURE FOR METAL AIR ELECTROCHEMICAL CELLS", all of which are incorporated by reference herein.

BACKGROUND OF THE INVENTION

1. Field of the Invention

This invention relates to metal air cells, and particularly to a metal air cell system having a novel configuration promoting efficient cell discharge and simplified oxidant management.

2. Description of the Prior Art

Electrochemical power sources are devices through which electric energy can be produced by means of electrochemical reactions. These devices include metal air electrochemical cells such as zinc air and aluminum air batteries. Certain metal electrochemical cells employ an anode comprised of metal particles that are fed into the cell and consumed during discharge. Such electrochemical cells are often called refuelable batteries. Zinc air refuelable battery cells include an anode, a cathode, and an electrolyte. The anode is generally formed of zinc particles immersed in electrolyte. The cathode generally comprises a semipermeable membrane and a catalyzed layer for electrochemical reaction. The electrolyte is usually a caustic liquid that is ionic conducting but not electrically conducting.

Metal air electrochemical cells have numerous advantages over traditional hydrogen-based fuel cells. Metal air electrochemical cells have high energy density (W*hr/Liter), high specific energy (W*hr/kg), and run at ambient temperature. Further, the supply of energy provided from metal air electrochemical cells is virtually inexhaustible because the fuel, such as zinc, is plentiful and can exist either as the metal or its oxide. The fuel may be solid state, therefore, safe and easy to handle and store. In contrast to a hydrogen-oxygen fuel cell, which uses methane, natural gas, or liquefied natural gas to provide as source of hydrogen, and emit polluting gases, the metal air electrochemical cells results in zero emission.

The metal air electrochemical cells operate at ambient temperature, whereas hydrogen-oxygen fuel cells typically operate at temperatures in the range of 150° C. to 1000° C. Metal air electrochemical cells are capable of delivering higher output voltages (1.5–3 Volts) than conventional fuel cells (<0.8V). Due to these advantages, metal air electrochemical cells can be used as power sources of all kind of applications, like stationary or mobile power plant, electric vehicle or portable electronic device, etc.

One of the principle obstacles of metal air electrochemical cells is the prevention of leakage of the electrolyte, typically a liquid electrolyte. For example, during refueling, the electrolyte can leak out and contaminate the user. Another obstacle relates to cell failure due to anode degradation. Where refuelability is provided, the anode and the cathode should have clearance between them. However, this clearance will increase uneven discharging at two of the major anode surfaces. Further, the clearance increases the internal resistance between the anode and cathode. The uneven discharge will reduce the life of the anode, and the power output and the life the metal air cell.

Another obstacle of metal air electrochemical cells relates to both oxygen and thermal management. Regarding thermal management, typical systems involve electrolyte circulation, which generally require multiple fluid transport components such as piping structures, pumps, and radiators. These fluid transport components minimize the overall system energy density and specific energy. Typical zinc air systems provide the same airflow for chemical reaction and also to remove heat. Even where electrolyte is circulated, is generally heat exchanged through air.

A further obstacle of metal air electrochemical cells is the inherent volume expansion of the metal, wherein the electrode shape may vary. Electrode shape change generally involves migration of zinc from the certain regions of the electrode to other reasons, and occurs, in part, as the active electrode material dissolves away during battery discharge. Swelling and deformity of zinc electrodes also occur due to the differences in volume of metallic zinc and its oxidation products zinc oxide and zinc hydroxide. Electrode shape distorts as the zinc is redeposited in a dense solid layer, thereby minimizing available active electrode material and preventing electrolyte access to the electrode interior.

Yet another obstacle relates to refueling of metal air cells. If the clearance between the anode and cathode is not large enough to accommodate the anode expansion, the cathode may be damaged and hence render refueling difficult or impossible. The distance between anode and cathode should be constant. If the distance between the anode and cathode is not constant, the discharging between the anode and cathode will be uneven. This uneven discharging will cause the anode to bend or deform. This bend on the anode is caused by the volume change due to the metal oxidation. When the anode is bent, the anode area which closer to the cathode discharges faster than the rest of the anode. This will increase the deformation. Therefore, the uneven discharging is magnified, and the problem continues until the bending causes cell failure, for example by shorting with the anode. Also, the uneven discharging will reduce the power output of the cell. If the cell is discharged at very high power, the regions of the anode closer to cathode will be passivated and lose functionality.

In order to refuel, the anode and cathode should have certain distance between them to provide the clearance for the refueling action. Conventionally, this clearance is filled with electrolyte and separator. However, this clearance will increase the cell internal resistance. This internal resistance will generate heat during use, which may cause various detriments. The heat consumes power from the cell, will dry out the electrolyte quickly, and speeds up the deterioration of the fuel cell. In order to reduce the internal resistance, the distance between the anode and cathode should be small and even. Nonetheless, this conventionally sacrifices durability. During the refueling process, if the distance between anode and cathode is not sufficient, the anode may scrape the cathode surface. Excess clearance, while reducing the likelihood of cathode damage during the refueling, increases the internal resistance. Therefore, conventionally provision of sufficient clearance between the anode and cathode results in increased internal resistance between them.

Therefore, a need remains in the art for a metal air cell that is refuelable, does not leak, minimizes anode degradation due to clearance between the anode and the cathode, and includes an efficient system for oxygen and thermal management.

SUMMARY OF THE INVENTION

The above-discussed and other problems and deficiencies of the prior art are overcome or alleviated by the metal air cell of the present invention. The cell The above-discussed and other features and advantages of the present invention will be appreciated and understood by those skilled in the art from the following detailed description and drawings.

BRIEF DESCRIPTION OF THE DRAWINGS

FIG. 4B is an embodiment of a releasing assembly for the anode;

FIG. 5 is another embodiment of a cathode structure having a solid end;

FIG. 6A is side view of an embodiment of an anode with an electrolyte reservoir;

FIG. 6B is a top view of the combined anode of FIG. 8;

FIG. 7 is side view of an embodiment of an anode with an electrolyte reservoir of FIG. 6A combined with the cathode of FIG. 5;

FIG. 8A shows an isometric exploded view of an alternative cathode structure;

FIG. 8B shows an assembled view of the cathode structure of FIG. 8A;

FIGS. 8C and 8D show enlarged sectional views of the cathode structure of FIG. 8A in uncompressed and compressed state, respectively;

FIGS. 9A and 9B show another cathode structure in unassembled and assembled states, respectively;

FIG. 17 is an isometric view of a fuel cartridge;

FIG. 18 is a front view of the cartridge of FIG. 17;

FIG. 19 is a side view of the cartridge of FIG. 17;

FIG. 20 is a top view of the cartridge of FIG. 17;

FIG. 21 is a bottom view of the cartridge of FIG. 17;

FIG. 30 is a top view of the anode structure of FIG. 28;

FIG. 31 is a side view of the anode structure of FIG. 28

FIG. 32 is a bottom view of the anode structure of FIG. 28;

FIG. 33 is an end view of the anode structure of FIG. 28; and

DETAILED DESCRIPTION OF THE ILLUSTRATIVE EMBODIMENTS

Figure 1:
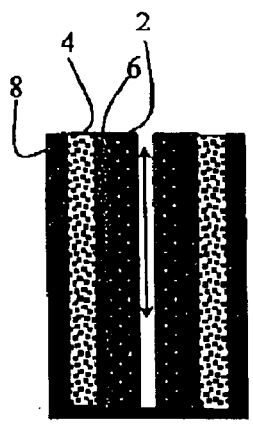
FIG. 1 is a generalized embodiment of a metal air electrochemical cell system of the present invention.

A metal air cell includes an anode and the cathode. An electrolyte is disposed between the cathode and the anode, the electrolyte provided within the anode, separately at the interface between the cathode and the anode, or both within the anode and separately at the interface between the cathode and the anode. In general, the anode is provided in two parts and the anode side of the cathode has two major surfaces that complement the anode parts. Accordingly, the anode parts are disposed outside of the cathode major surfaces.

In further embodiments, the metal air cell incorporates a fluid management system, comprising an oxidant passageway in fluid communication with a cathode of the cell and a thermal management passageway for removal of heat and provision of cooling fluid. The oxidant passageway can be in fluid communication with ambient air, a substantially pure oxygen source, or both.

Referring now to the drawings, an illustrative embodiment of the present invention will be described. For clarity of the description, like features shown in the figures shall be indicated with like reference numerals and similar features as shown in alternative embodiments shall be indicated with similar reference numerals.

Referring now to FIG. 1, the metal air electrochemical cell system 1 of the present invention is depicted. The cell 1 includes a pair of cathode portions 2 and a pair of anode portions 4 in ionic communication via electrolyte 6, the cell components contained in a housing 8. The cathode portions 2 are configured to allow airflow therebetween, providing oxidant supply thereto. This design is in stark contrast to conventional cells, wherein oxidant is typically supplied to the outer portions of the cell to supply oxidant.

As shown in FIG. 1, the cell components may all be substantially parallel. In such a configuration, where it is desirable to replace the anode portions 4, various mechanical structures may be employed to physically remove the anode portions 4 from the housing 8. For example, the housing may include a break portion, such that screws thread or other linear (or angular) motion devices may be used to physically separate the cell 1 into two halves.

Alternatively, and referring now to FIGS. 2A–5, a cathode 10 of the metal air electrochemical cell 42 may be supported by a wedge shaped structure 12. The wedge shape may be provided to facilitate removal of the cathode structure, thereby easily accessing the anode portions.

Figure 2A:
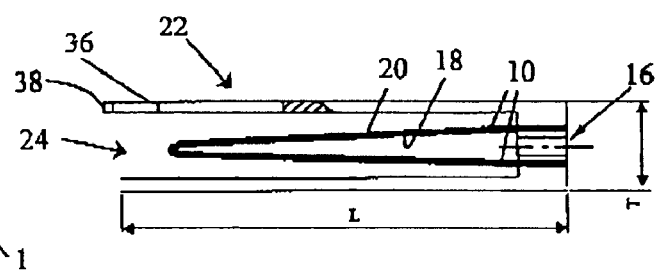
FIG. 2A is a side view of a cathode structure of a metal air cell.
Figure 2B:
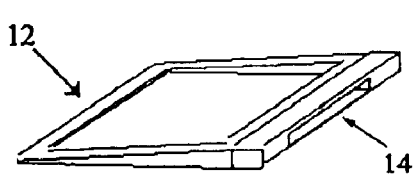
FIG. 2B is an isometric view of a support structure for the cathode.

The cathode 10 generally requires an active constituent and a diluent, along with suitable connecting structures, such as a current collector. Referring particularly to FIG. 2B, an air channel opening 14 is provided on the wide end of the wedge structure 12 to provide air or oxygen circulation into an air channel 16 generally leading to the active regions of the cathode. The cathode 10 may optionally comprise a protective layer (e.g., polytetrafluoroethylene commercially available under the trade name Teflon® from E.I. du Pont Nemours and Company Corp., Wilmington, Del.) on a side 18, which is juxtaposed in relation to a plane of the wedge structure, and an active cathode surface on a side 20, which is facing outward (e.g., see FIG. 2C). The cathode materials including the protective layer (optional), the active cathode surface, and the diluent may be any suitable material as is known to those skilled in the art. Generally, the cathode catalyst is selected to attain current densities (in ambient air) of at least 20 milliamperes per squared centimeter (mA/$cm^2$), preferably at least 50 mA/$cm^2$, and more preferably at least 100 mA/$cm^2$. Higher current densities may be attained with suitable cathode catalysts and formulations and with use of higher oxygen concentrations, such as substantially pure air.

Figure 2C:
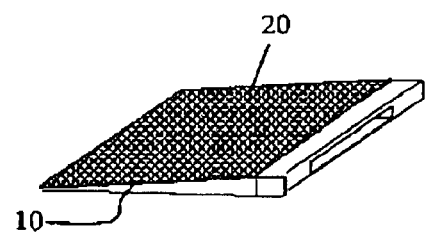
FIG. 2C is an isometric view of the support structure of FIG. 2A having a cathode formed thereon.

Referring now to FIG. 2C, the cathode 10 is wrapped around the wedge structure 12 to form a wedge cathode structure. The wedge cathode structure is put into a case 22. The case 22 generally is enclosed with one end having the air channel and one open end 24. The open end 24 allows for insertion of the anode cartridge, as described further herein. The case 22 serves to protect the delicate cathode 10 and also to prevent the user to contact the cathode 10 and electrolyte.

Figure 3A:
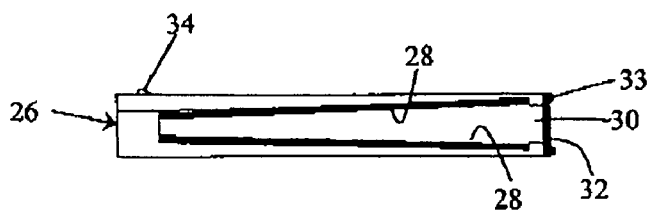
FIG. 3A is a side view of an anode structure of a metal air cell.
Figure 3B:
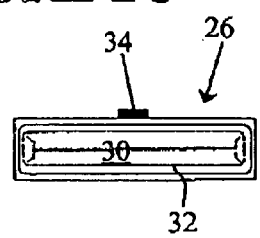
FIG. 3B is a top view of the anode structure of a metal air cell.
Figure 4A:
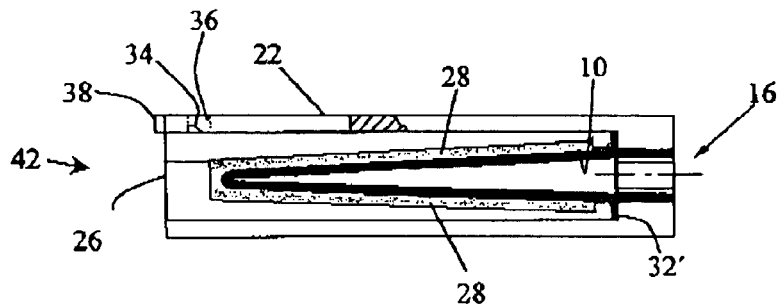
FIG. 4A shows assembly of the anode and cathode.

Referring now to FIG. 3A, a fuel cartridge 26 for the metal air cell 42 comprises a pair of anode portions 28. The anode portions 28 are formed or disposed on inside surfaces of the cavity within the cartridge 26. The angle between these two anode portions 28 is preferably close to the angle of the wedge structure 12, and more preferably the angle between these two anode portions 28 is identical to the angle of the wedge structure 12. FIG. 4A shows assembly of the fuel cartridge 26 and case 22 into the metal air cell 42. In embodiments where the anodes 28 and cathode 10 have the same wedge angle, there will be a tight fit between the electrodes.

The angle of the wedge structure (i.e., in relation to the plane of the case 22) may vary depending on factors such as: required form factor; desired energy density (e.g., in W*hr/Liter); the desired ease of removal of the cathode, desired flex of the cathode structure; and the like. As shown in FIG. 1, the angle may be 0 degrees, such that the components are substantially parallel. The angle may be much higher, e.g., on the order of about 45 degrees, for example. In a preferred embodiment, the angle is about 0.5 degrees to about 10 degrees, and in a more preferred embodiment, the angle is about 1 degree to about 3 degrees. Of course, these angles may be optimized based on factors including those listed above.

An end 30 of the fuel cartridge 26, which is where the cathode 10 is generally inserted, may optionally comprise an elastomeric seal 32 (e.g., rubber or silicon). This is used typically to prevent the electrolyte from drying out, minimize or prevent contamination of the fuel cartridge 26, and prolong the shelf life of the fuel cartridge 26.

This seal is deflected (see 32' in FIG. 4A) during insertion of the fuel cartridge 26 into the cathode case 22. While the fuel cartridge 26 is inserted into the cathode case 22, the elastomeric seal 32 in the fuel cartridge 26 will be squeezed. A pair of bumps 33 on the seal 22 provides a force that, due to the elasticity of the material, is capable of releasing the fuel cartridge 26 from the cathode case 22.

Another function of the seal 32 is to wipe off any electrolyte on the cathode surface during the refuel process. To refuel, generally a spent fuel cartridge 26 is removed and a fresh fuel cartridge 26 is inserted. Therefore, the seal 32 helps maintain electrolyte within the system.

The materials to form the anode may be pressed, sintered, or otherwise formed into the desired shape. In one embodiment, an electrolyte comprises a solid, liquid, or combination thereof that is in ionic communication with the cathode 10 and the anodes 28. In an alternative embodiment, at least a portion of the electrolyte used in the cell is embedded into the porous structure of the anode, as described herein. A separator layer would therefore be disposed between the anode and cathode for electrical isolation. The separator can be disposed the surface of either on the anode, the cathode, or both the anode and cathode.

Anodes 28 generally comprise a metal constituent such as metal and/or metal oxides and a current collector. Optionally an ionic conducting medium is provided within each anode 28. Further, in certain embodiments, anodes 12 comprises a binder and/or suitable additives. Preferably, the formulation optimizes ion conduction rate, capacity, density, and overall depth of discharge, while minimizing shape change during cycling.

The metal constituent may comprise mainly metals and metal compounds such as zinc, calcium, lithium, magnesium, ferrous metals, aluminum, oxides of at least one of the foregoing metals, or combinations and alloys comprising at least one of the foregoing metals. These metals may also be mixed or alloyed with constituents including, but not limited to, bismuth, calcium, magnesium, aluminum, indium, lead, mercury, gallium, tin, cadmium, germanium, antimony, selenium, thallium, oxides of at least one of the foregoing metals, or combinations comprising at least one of the foregoing constituents. The metal constituent may be provided in the form of powder, fibers, dust, granules, flakes, needles, pellets, or other particles. In certain embodiments, granule metal, particularly zinc alloy metal, is provided as the metal constituent. During conversion in the electrochemical process, the metal is generally converted to a metal oxide.

The anode current collector may be any electrically conductive material capable of providing electrical conductivity and optionally capable of providing support to the anode 28 (e.g., wherein the current collector is employed as a portion of the cartridge. 26). The current collector may be formed of various electrically conductive materials including, but not limited to, copper, brass, ferrous metals such as stainless steel, nickel, carbon, electrically conducting polymer, electrically conducting ceramic, other electrically conducting materials that are stable in alkaline environments and do not corrode the electrode, or combinations and alloys comprising at least one of the foregoing materials. The current collector may be in the form of a mesh, porous plate, metal foam, strip, wire, plate, or other suitable structure.

The optional binder of the anode primarily maintains the constituents of the anode in a solid or substantially solid form in certain configurations. The binder may be any material that generally adheres the anode material and the current collector to form a suitable structure, and is generally provided in an amount suitable for adhesive purposes of the anode. This material is preferably chemically inert to the electrochemical environment. In certain embodiments, the binder material is soluble, or can form an emulsion, in water, and is not soluble in an electrolyte solution. Appropriate binder materials include polymers and copolymers based on polytetrafluoroethylene (e.g., Teflon® and Teflon® T-30 commercially available from E.I. du Pont Nemours and Company Corp., Wilmington, Del.), polyvinyl alcohol (PVA), poly(ethylene oxide) (PEO), polyvinylpyrrolidone (PVP), and the like, and derivatives, combinations and mixtures comprising at least one of the foregoing binder materials. However, one of skill in the art will recognize that other binder materials may be used.

Optional additives may be provided to prevent corrosion. Suitable additives include, but are not limited to indium oxide; zinc oxide, EDTA, surfactants such as sodium stearate, potassium Lauryl sulfate, Triton® X-400 (available from Union Carbide Chemical & Plastics Technology Corp., Danbury, Conn.), and other surfactants; the like; and derivatives, combinations and mixtures comprising at least one of the foregoing additive materials. However, one of skill in the art will determine that other additive materials may be used.

The electrolyte or ionic conducting medium generally comprises alkaline media to provide a path for hydroxyl to reach the metal and metal compounds. The ionically conducting medium may be in the form of a bath, wherein a liquid electrolyte solution is suitably contained. In certain embodiments, an ion conducting amount of electrolyte is provided in anode 28. The electrolyte generally comprises ionic conducting materials such as KOH, NaOH, LiOH, other materials, or a combination comprising at least one of the foregoing electrolyte media. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 45% ionic conducting materials. Other electrolytes may instead be used, however, depending on the capabilities thereof, as will be obvious to those of skill in the art.

The oxygen supplied to the cathode portions 10 may be from any oxygen source, such as air; scrubbed air; pure or substantially oxygen, such as from a utility or system supply or from on site oxygen manufacture; any other processed air; or any combination comprising at least one of the foregoing oxygen sources.

Cathode portions 10 may be conventional air diffusion cathodes, for example generally comprising an active constituent and a carbon substrate, along with suitable connecting structures, such as a current collector. Typically, the cathode catalyst is selected to attain current densities in ambient air of at least 20 milliamperes per squared centimeter (mA/cm2), preferably at least 50 mA/cm2, and more preferably at least 100 mA/cm2. Of course, higher current densities may be attained with suitable cathode catalysts and formulations. The cathode may be a bi-functional, for example, which is capable of both operating during discharging and recharging. However, utilizing the systems described herein, the need for a bi-functional cathode is obviated, since the third electrode serves as the charging electrode.

The carbon used is preferably be chemically inert to the electrochemical cell environment and may be provided in various forms including, but not limited to, carbon flake, graphite, other high surface area carbon materials, or combinations comprising at least one of the foregoing carbon forms.

The cathode current collector may be any electrically conductive material capable of providing electrical conductivity and preferably chemically stable in alkaline solutions, which optionally is capable of providing support to the cathode portions 10. The current collector may be in the form of a mesh, porous plate, metal foam, strip, wire, plate, or other suitable structure. The current collector is generally porous to minimize oxygen flow obstruction. The current collector may be formed of various electrically conductive materials including, but not limited to, copper, ferrous metals such as stainless steel, nickel, chromium, titanium, and the like, and combinations and alloys comprising at least one of the foregoing materials. Suitable current collectors include porous metal such as nickel foam metal.

A binder is also typically used in the cathode, which may be any material that adheres substrate materials, the current collector, and the catalyst to form a suitable structure. The binder is generally provided in an amount suitable for adhesive purposes of the carbon, catalyst, and/or current collector. This material is preferably chemically inert to the electrochemical environment. In certain embodiments, the binder material also has hydrophobic characteristics. Appropriate binder materials include polymers and copolymers based on polytetrafluoroethylene (e.g., Teflon® and Teflon® T-30 commercially available from E.I. du Pont Nemours and Company Corp., Wilmington, Del.), polyvinyl alcohol (PVA), poly(ethylene oxide) (PEO), polyvinylpyrrolidone (PVP), and the like, and derivatives, combinations and mixtures comprising at least one of the foregoing binder materials. However, one of skill in the art will recognize that other binder materials may be used.

The active constituent is generally a suitable catalyst material to facilitate oxygen reaction at the cathode. The catalyst material is generally provided in an effective amount to facilitate oxygen reaction at the cathode. Suitable catalyst materials include, but are not limited to: manganese, lanthanum, strontium, cobalt, platinum, and combinations and oxides comprising at least one of the foregoing catalyst materials. An exemplary air cathode is disclosed in copending, commonly assigned U.S. patent application Ser. No. 09/415,449, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

To electrically isolate the anode from the cathode, a separator is provided between the electrodes, as is known in the art. The separator may be any commercially available separator capable of electrically isolating the anode and the cathode, while allowing sufficient ionic transport therebetween. Preferably, the separator is flexible, to accommodate electrochemical expansion and contraction of the cell components, and chemically inert to the cell chemicals. Suitable separators are provided in forms including, but not limited to, woven, non-woven, porous (such as microporous or nanoporous), cellular, polymer sheets, and the like. Materials for the separator include, but are not limited to, polyolefin (e.g., Gelgard® commercially available from Dow Chemical Company), polyvinyl alcohol (PVA), cellulose (e.g., nitrocellulose, cellulose acetate, and the like), polyethylene, polyamide (e.g., nylon), fluorocarbon-type resins (e.g., the Nafion® family of resins which have sulfonic acid group functionality, commercially available from du Pont), cellophane, filter paper, and combinations comprising at least one of the foregoing materials. The separator 16 may also comprise additives and/or coatings such as acrylic compounds and the like to make them more wettable and permeable to the electrolyte.

In certain embodiments, the separator comprises a membrane having electrolyte, such as hydroxide conducting electrolytes, incorporated therein. The membrane may have hydroxide conducing properties by virtue of: physical characteristics (e.g., porosity) capable of supporting a hydroxide source, such as a gelatinous alkaline material; molecular structure that supports a hydroxide source, such as an aqueous electrolyte; anion exchange properties, such as anion exchange membranes; or a combination of one or more of these characteristics capable of providing the hydroxide source.

For instance, the separator may comprise a material having physical characteristics (e.g., porosity) capable of supporting a hydroxide source, such as a gelatinous alkaline solution. For example, various separators capable of providing ionically conducting media are described in: U.S. Pat. No. 5,250,370 entitled "Variable Area Dynamic Battery," Sadeg M. Faris, Issued Oct. 5, 1993; U.S. application Ser. No. 08/944,507 filed Oct. 6, 1997 entitled "System and Method for Producing Electrical Power Using Metal Air Fuel Cell Battery Technology," Sadeg M. Faris, Yuen-Ming Chang, Tsepin Tsai, and Wayne Yao; U.S. application Ser. No. 09/074,337 filed May 7, 1998 entitled "Metal-Air Fuel Cell Battery Systems," Sadeg M. Faris and Tsepin Tsai; U.S. application Ser. No. 09/110,762 filed Jul. 3, 1998 entitled "Metal-Air Fuel Cell Battery System Employing Metal Fuel Tape and Low-Friction Cathode Structures," Sadeg M. Faris, Tsepin Tsai, Thomas J. Legbandt, Muguo Chen, and Wayne Yao; U.S. Pat. No. 6,190,792 issued Feb. 20, 2001 entitled "Ionically-Conductive Belt Structure for Use in a Metal-Air Fuel Cell Battery System and Method of Fabricating the Same," Sadeg M. Faris, Tsepin Tsai, Thomas Legbandt, Wenbin Yao, and Muguo Chen; U.S. application Ser. No. 09/116,643 filed Jul. 16, 1998 entitled "Metal-Air Fuel Cell Battery System Employing Means for Discharging and Recharging Metal-Fuel Cards," Sadeg M. Faris, Tsepin Tsai, Wenbin Yao, and Muguo Chen; U.S. application Ser. No. 09/268,150 filed Mar. 15, 1999 entitled "Movable Anode Fuel Cell Battery," by Tsepin Tsai and William Morris; U.S. application Ser. No. 09/526,669 filed Mar. 15, 2000 "Movable Anode Fuel Cell Battery," Tsepin Tsai, William F. Morris, all of which are herein incorporated by reference.

In general, the type of material having physical characteristics capable of supporting a hydroxide source may comprise an electrolyte gel. The electrolyte gel may be either applied directly on the surface of the evolution and/or reduction electrodes, or applied as a self supported membrane between the evolution and reduction electrodes. Alternatively, the gel may be supported by a substrate and incorporated between the evolution and reduction electrodes.

The electrolyte (either within any one of the variations of the separator herein, or as a liquid within the cell structure in general) generally comprises ion conducting material to allow ionic conduction between the metal anode and the cathode. The electrolyte generally comprises hydroxide-conducting materials such as KOH, NaOH, LiOH, RbOH, CsOH or a combination comprising at least one of the foregoing electrolyte media. In preferred embodiments, the hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 40% ionic conducting materials.

The gelling agent for the membrane may be any suitable gelling agent in sufficient quantity to provide the desired consistency of the material. The gelling agent may be a crosslinked polyacrylic acid (PAA), such as the Carbopol® family of crosslinked polyacrylic acids (e.g., Carbopol® 675) available from BF Goodrich Company, Charlotte, N.C., Alcosorb® G1 commercially available from Allied Colloids Limited (West Yorkshire, GB), and potassium and sodium salts of polyacrylic acid; carboxymethyl cellulose (CMC), such as those available from Aldrich Chemical Co., Inc., Milwaukee, Wis.; hydroxypropylmethyl cellulose; gelatine; polyvinyl alcohol (PVA); poly(ethylene oxide) (PEO); polybutylvinyl alcohol (PBVA); combinations comprising at least one of the foregoing gelling agents; and the like. Generally, the gelling agent concentration is from about 0.1% to about 50% preferably about 2% to about 10%.

The optional substrate may be provided in forms including, but not limited to, woven, non-woven, porous (such as microporous or nanoporous), cellular, polymer sheets, and the like, which are capable of allowing sufficient ionic transport between the reduction and evolution electrodes. In certain embodiments, the substrate is flexible, to accommodate electrochemical expansion and contraction of the cell components, and chemically inert to the cell materials. Materials for the substrate include, but are not limited to, polyolefin (e.g., Gelgard® commercially available from Daramic Inc., Burlington, Mass.), polyvinyl alcohol (PVA), cellulose (e.g., nitrocellulose, cellulose acetate, and the like), polyamide (e.g., nylon), cellophane, filter paper, and combinations comprising at least one of the foregoing materials. The substrate may also comprise additives and/or coatings such as acrylic compounds and the like to make them more wettable and permeable to the electrolyte.

In other embodiments of a hydroxide-conducting membrane as a separator, a molecular structure is provided that supports a hydroxide source, such as an aqueous electrolyte. Such membranes are desirable in that conductivity benefits of aqueous electrolytes may be achieved in a self supported solid state structure. In certain embodiments, the membrane may be fabricated from a composite of a polymeric material and an electrolyte. The molecular structure of the polymeric material supports the electrolyte. Cross-linking and/or polymeric strands serve to maintain the electrolyte.

In one example of a conductive separator, a polymeric material such as polyvinyl chloride (PVC) or poly(ethylene oxide) (PEO) is formed integrally with a hydroxide source as a thick film. In a first formulation, one mole of KOH and 0.1 mole of calcium chloride are dissolved in a mixed solution of 60 milliliters of water and 40 milliliters of tetrahydrogen furan (THF). Calcium chloride is provided as a hygroscopic agent. Thereafter, one mole of PEO is added to the mixture. In a second formulation, the same materials for the first formula are used, with the substitution of PVC for PEO. The solution is cast (or coated) as a thick film onto substrate, such as polyvinyl alcohol (PVA) type plastic material. Other substrate materials preferably having a surface tension higher than the film material may be used. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulations, it is possible to form ionically-conductive films having a thickness in the range of about 0.2 to about 0.5 millimeters.

Other embodiments of conductive membranes suitable as a separator are described in greater detail in: U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. patent application Ser. No. 09/482,126 entitled "Solid Gel Membrane Separator in Rechargeable Electrochemical Cells", by Muguo Chen, Tsepin Tsai and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties.

In certain embodiments, the polymeric material used as separator comprises a polymerization product of one or more monomers selected from the group of water soluble ethylenically unsaturated amides and acids, and optionally a water soluble or water swellable polymer. The polymerized product may be formed on a support material or substrate. The support material or substrate may be, but not limited to, a woven or nonwoven fabric, such as a polyolefin, polyvinyl alcohol, cellulose, or a polyamide, such as nylon.

The electrolyte may be added prior to polymerization of the above monomer(s), or after polymerization. For example, in one embodiment, electrolyte may be added to a solution containing the monomer(s), an optional polymerization initiator, and an optional reinforcing element prior to polymerization, and it remains embedded in the polymeric material after the polymerization. Alternatively, the polymerization may be effectuated without the electrolyte, wherein the electrolyte is subsequently included.

The water soluble ethylenically unsaturated amide and acid monomers may include methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, and the sodium salt of vinylsulfonic acid, other water soluble ethylenically unsaturated amide and acid monomers, or combinations comprising at least one of the foregoing monomers.

The water soluble or water swellable polymer, which acts as a reinforcing element, may include polysulfone (anionic), poly(sodium 4-styrenesulfonate), carboxymethyl cellulose, sodium salt of poly(styrenesulfonic acid-co-maleic acid), corn starch, any other water-soluble or water-swellable polymers, or combinations comprising at least one of the foregoing water soluble or water swellable polymers. The addition of the reinforcing element enhances mechanical strength of the polymer structure.

Optionally, a crosslinking agent, such as methylenebisacrylamide, ethylenebisacrylamide, any water-soluble N,N'-alkylidene-bis(ethylenically unsaturated amide), other crosslinkers, or combinations comprising at least one of the foregoing crosslinking agents.

A polymerization initiator may also be included, such as ammonium persulfate, alkali metal persulfates and peroxides, other initiators, or combinations comprising at least one of the foregoing initiators. Further, an initiator may be used in combination with radical generating methods such as radiation, including for example, ultraviolet light, X-ray, γ-ray, and the like. However, the chemical initiators need not be added if the radiation alone is sufficiently powerful to begin the polymerization.

In one method of forming the polymeric material, the selected fabric may be soaked in the monomer solution (with or without the ionic species), the solution-coated fabric is cooled, and a polymerization initiator is optionally added. The monomer solution may be polymerized by heating, irradiating with ultraviolet light, gamma-rays, x-rays, electron beam, or a combination thereof, wherein the polymeric material is produced. When the ionic species is included in the polymerized solution, the hydroxide ion (or other ions) remains in solution after the polymerization. Further, when the polymeric material does not include the ionic species, it may be added by, for example, soaking the polymeric material in an ionic solution.

Polymerization is generally carried out at a temperature ranging from room temperature to about 130° C., but preferably at an elevated temperature ranging from about 75° to about 100° C. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, gamma-rays, x-rays, electron beam, or a combination thereof.

To control the thickness of the membrane, the coated fabric may be placed in suitable molds prior to polymerization. Alternatively, the fabric coated with the monomer solution may be placed between suitable films such as glass and polyethylene teraphthalate (PET) film. The thickness of the film may be varied will be obvious to those of skill in the art based on its effectiveness in a particular application. In certain embodiments, for example for separating oxygen from air, the membrane or separator may have a thickness of about 0.1 mm to about 0.6 mm. Because the actual conducting media remains in aqueous solution within the polymer backbone, the conductivity of the membrane is comparable to that of liquid electrolytes, which at room temperature is significantly high. In still further embodiments of the separator, anion exchange membranes are employed. Some exemplary anion exchange membranes are based on organic polymers comprising a quaternary ammonium salt structure functionality; strong base polystyrene divinylbenzene cross-linked Type I anion exchangers; weak base polystyrene divinylbenzene cross-linked anion exhangers; strong base/weak base polystyrene divinylbenzene cross-linked Type II anion exchangers; strong base/weak base acrylic anion exchangers; strong base perfluoro aminated anion exchangers; naturally occurring anion exchangers such as certain clays; and combinations and blends comprising at least one of the foregoing materials. An exemplary anion exchange material is described in greater detail in U.S. Provisional Patent Application No. 60/307,312 entitled "Anion Exchange Material", by Muguo Chen and Robert Callahan, filed on Jul. 23, 2001, and incorporated by reference herein.

Another example of a suitable anion exchange membrane is described in greater detail in U.S. Pat. No. 6,183,914 and incorporated by reference herein. The membrane includes an ammonium-based polymer comprising (a) an organic polymer having an alkyl quaternary ammonium salt structure; (b) a nitrogen-containing, heterocyclic ammonium salt; and (c) a source of hydroxide anion.

In yet another embodiment, mechanical strength of the resulting membrane may be increased by casting the composition on a support material or substrate, which is preferably a woven or nonwoven fabric, such as a polyolefin, polyester, polyvinyl alcohol, cellulose, or a polyamide, such as nylon.

Optionally, and referring also now to FIG. 5, on the top of the fuel cartridge 26 a locking tip 34 is provided. The locking tip 34 can securely lock the fuel cartridge 26 inside the cathode case 22 through an opening 36. A corresponding releasing tip 38 may be lifted upward, facilitated by a pair of slots 40, for example, which will allow the locking tip 34 on the fuel cartridge 26 to be released from the opening 36, for example, with an external manual or mechanical force, or with an internally provided force such as that from the seal 32 having the bumps 33.

An alternative configuration is shown in FIG. 5, having a cathode 110 provided within a case 122, wherein an end portion 140 is attached to the apex of the cathode 110. The configuration for a fuel cartridge 126 complementing the case 122 is shown in FIG. 6A. This anode cartridge has a gel or liquid electrolyte reservoir 142 at an end thereof. The other features of the anode cartridge and cathode case 122 described with respect to FIGS. 5–7 are numbered in increments of 100 as compared to the structures described with respect to FIGS. 2A–4B. FIG. 7 shows the assembly of this design. The solid end of the cathode occupies the electrolyte reservoir inside the anode cartridge. The electrolyte or the moisture inside the reservoir is squeezed into the interface between the cathode and anode. This feature will enhance the conductivity and reaction between the anode and cathode.

Referring now to FIGS. 8A–9B, an alternative cathode structure 312 is depicted. The cathode structure includes a compressible, and accordingly, expandable, support structure having one or more cathodes thereon. The cathodes or cathode portions is/are in fluid communication with an oxidant generally through the support structure (e.g., through appropriate shaping and formation of the support structure, apertures formed therein, or the like). The support structure may have expandable and compressible characteristics by virtue of compressible sub-members (e.g., elastomeric material, springs, etc.) integral or incorporated within the support structure, compressible seals configured between at least portions of a pair of support structure portion, appropriate shaping and formation of the support structure, or the like.

In particular, and referring to FIGS. 8A and 8B, the cathode structure 312 includes a pair of support structures 311, which are generally identical, and are configured to be facially opposing each other. A compression member 315 is disposed between the support structures 311. Each of the support structures includes a cut-away portion 317, which, upon assembly of the cathode structure 312, form an air opening 319. Each support structure 311 includes a central opening portion 323 and a frame portion 321. A cathode layer is adhered to the frame portion 323 of both support structures 311 generally as described above with respect to FIG. 2B.

Referring now to FIGS. 8C and 8D, an enlarged view of the interface between the anode, cathode, and support structure including structures 311 and the compressible member 315 is depicted. During the discharging operation, energy is produced upon electrochemical reaction of the metal material in an anode portion 328. The electrochemical reaction results in conversion of the metal to a metal oxide. Upon conversion of the metal to the metal oxide, and referring particularly now to FIG. 8D, it is not uncommon to encounter expanded regions 339, generally due to the larger volume taken up by metal oxide as compared to metal. Therefore, to alleviate pressures within the cathode structure 312, the compressible member 315 compresses due to the forces of the expanded anode portion 328, thereby allowing room for the volume expansion of the anode portion 328 and alleviating pressures on a cathode layer 10 and the cathode structure 312 in general.

The compressible member 315 may shaped as to contact the frame portion 321 of the support structures 311. For example, an elastomeric material may be disposed between the support structures 311. Suitable elastomeric materials include, but are not limited to, rubbers, silicones, flouroelastomers, and the like. Further, the compressible member 315 may be realized in the form of one or more springs (e.g., torsion, compression, leaf, etc.), miniature hydraulic devices, or a combination thereof.

Referring now to FIGS. 9A and 9B, an embodiment of a cathode structure 412 is depicted. Cathode structure 412 comprises a pair of support structures 411. The pair of support structures are assembled with a compressible member 415 therebetween, generally to accommodate anode expansion as described above.

Figure 10A:
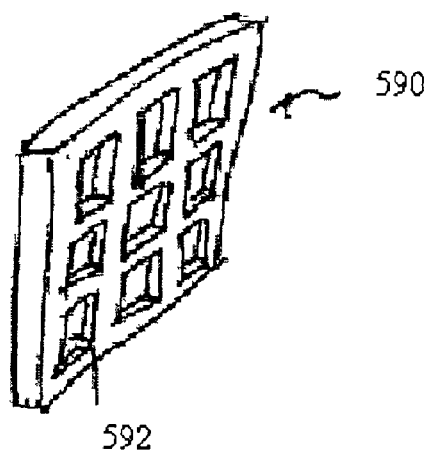
FIG. 10A shows an anode structure.
Figure 10B:
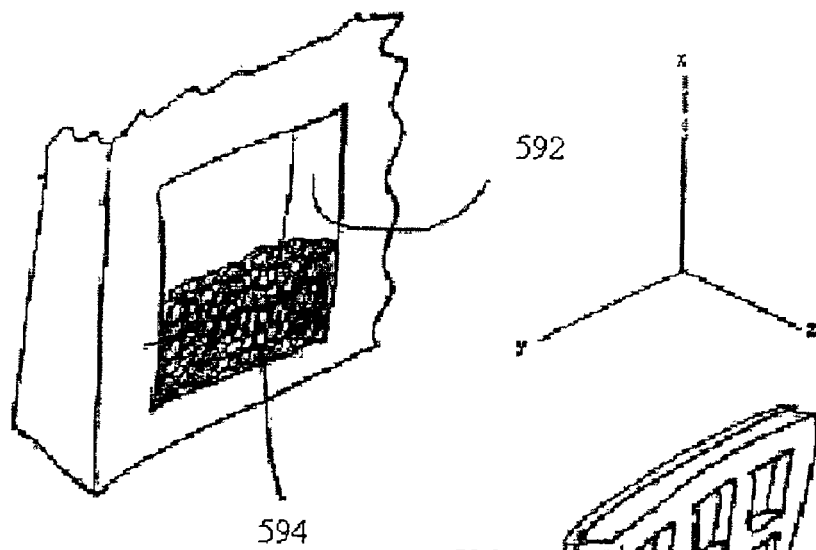
FIG. 10B shows a single grid of the anode structure of FIG. 10A.
Figure 10C:
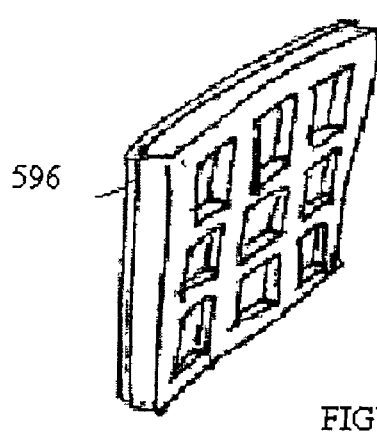
FIG. 10C shows an anode structure having a separator attached thereto.
Figures 11, 13:
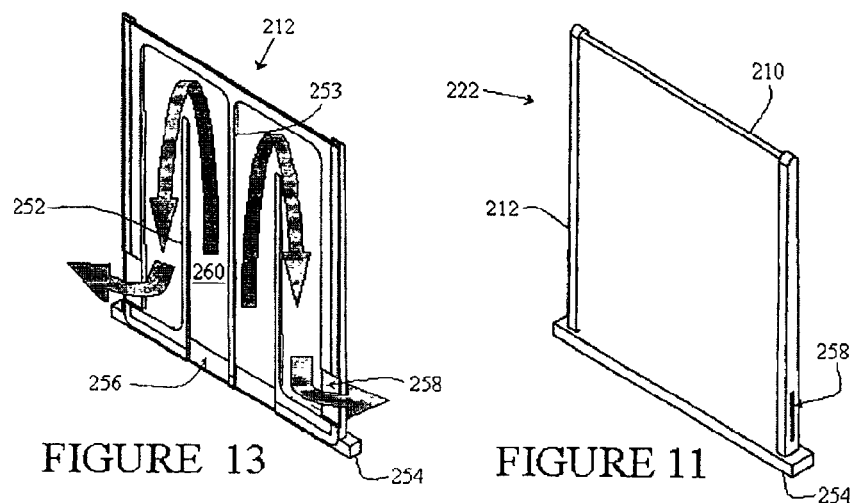
FIG. 11 is an isometric view of a cathode assembly.
FIG. 13 is an isometric view of a structure for the cathode assembly of FIG. 11.
Figures 12, 14, 15, 16:
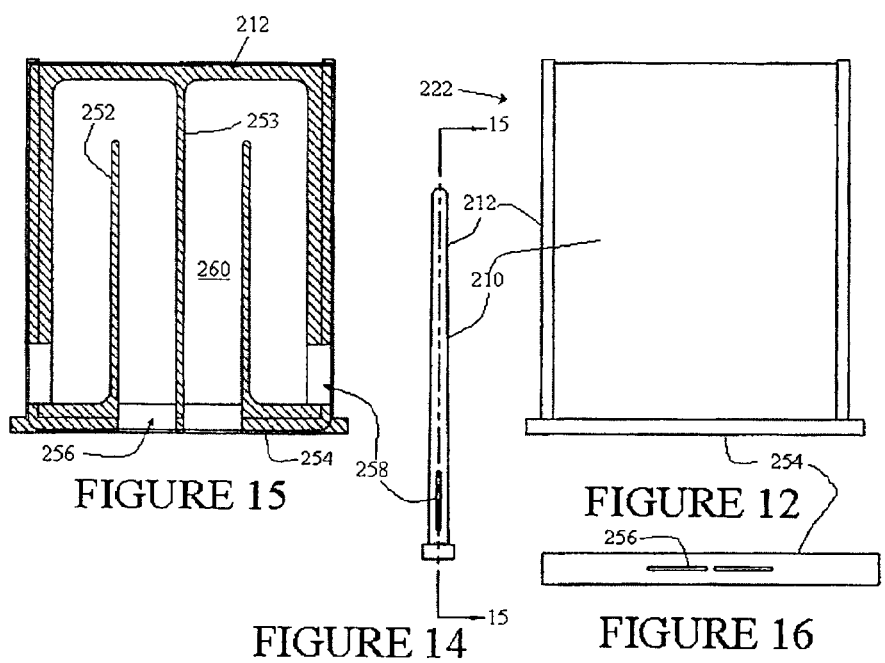
FIG. 12 is a front view of the assembly of FIG. 11.
FIG. 14 is a side view of the cathode assembly of FIG. 11.
FIG. 15 is a sectional view along lines 15—15 of FIG. 14.
FIG. 16 is a bottom view of the cathode assembly of FIG. 11.
Figure 22:
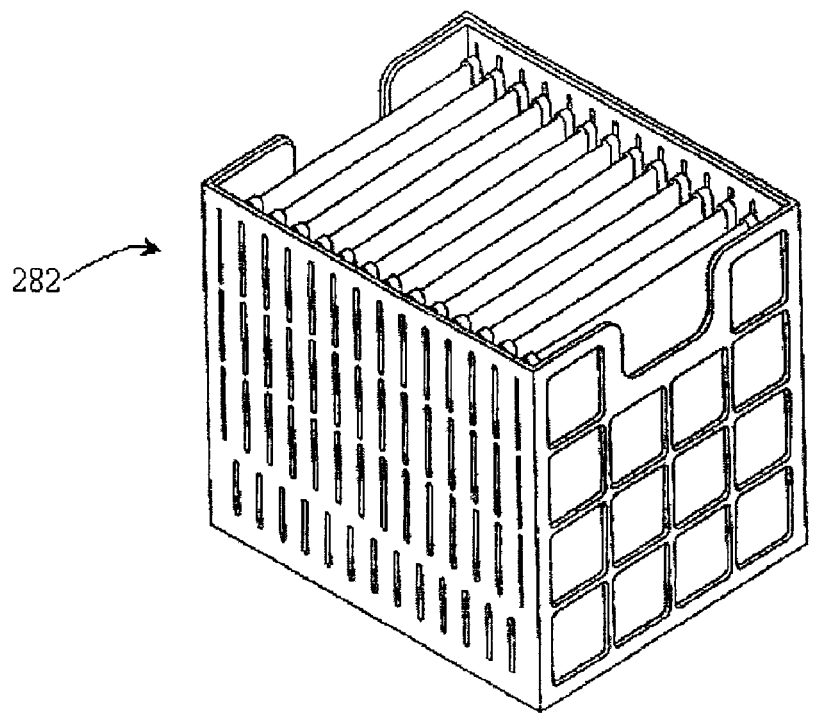
FIG. 22 is a top isometric view of a cathode structure.
Figure 23:
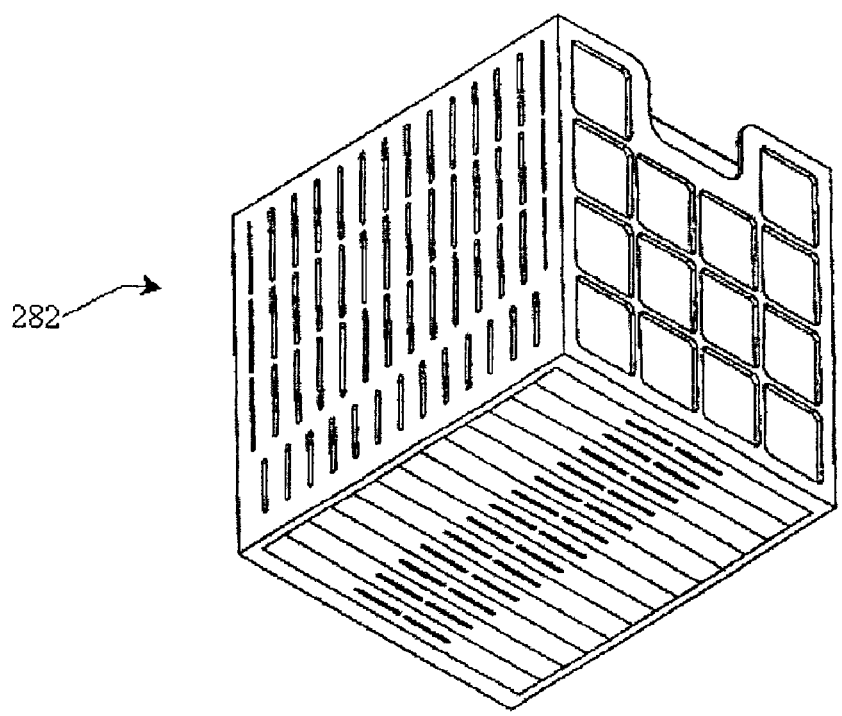
FIG. 23 is a bottom isometric view of the cathode structure of FIG. 22.
Figure 24:
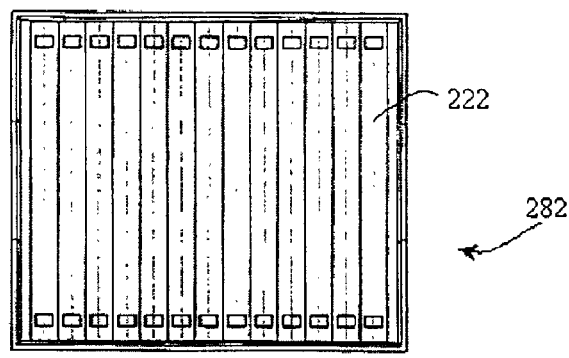
FIG. 24 is a top view of the cathode structure of FIG. 22.
Figure 25:
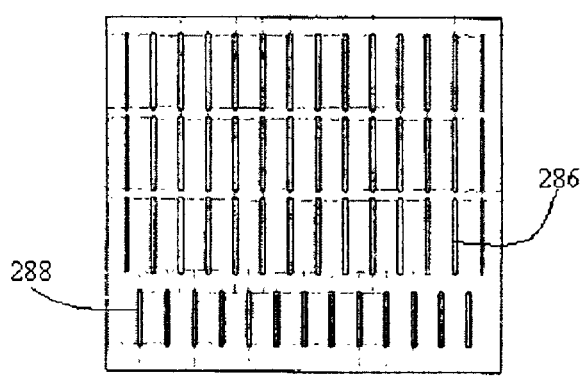
FIG. 25 is a side view of the cathode structure of FIG. 22

In addition to or instead of modifying the cathode structure to accommodate for anode expansion, the anode material may be provided in a form that accommodated expansion. Referring now to FIGS. 10A–10C, a grid shaped anode structure 590 is depicted. The anode structure 590 includes a plurality of compartments 592. The compartments 592 may be in complete physical isolation from one another, or alternatively, may be in partial isolation from one another. For example, pores or channels may be provided between one or more of the compartments to provide partial access from connected compartments. These pores or channels may also provide additional volume to accommodate anode expansion.

The material of construction for the anode structure may be any suitable material capable of imparting the necessary structural integrity, and can withstand the electrochemical environment, including the electrolyte and the thermal limits. These materials may be electrically non-conductive, or alternatively conductive, wherein the anode structure 592 further serves as a current collector. Suitable electrically nonconductive materials include, but are not limited to, acrylonitrile butadiene styrene polymer, polyvinyl chloride, epoxy glass, fluorocarbons, polycarbonate, the like, and combinations comprising at least one of the foregoing materials. Suitable electrically conductive materials include, but are not limited to, copper, plated ferrous metals such as stainless steel, tin, brass, lead, silver, and the like, and combinations and alloys comprising at least one of the foregoing materials.

Referring now to FIG. 10B, an enlarged view of a compartment 592 is depicted. The compartment 592 includes a quantity of anode material 594. The quantity of anode material 594 relates to the volume of the compartment 592, while allowing for additional volume to accommodate for expansion of anode material during electrochemical reaction. Preferably, the volume of the compartment 592 and the quantity of anode material 594 (and accordingly, the properties of the anode material 594 such as the viscosity) are coordinated to minimize anode expansion in the direction if the Z-axis (as indicated in FIG. 10B). Generally, the volume of the compartment 592 and the quantity of anode material 594 are selected such that the pressure caused by anode expansion in the Z-direction is less than about 1 psi, and preferably less than about 0.5 psi, and more preferably less than about 0.2. psi. Further, the volume of anode material preferably allows for sufficient electrical production when the anode structure 590 having anode material 594 therein is used in an electrochemical cell, as described further herein. Typically, the initial volume of anode material 594 is related to the viscosity of the anode material. In general, as the viscosity of the anode material increases, the initial volume of the anode material 594 decreases, and accordingly, as the viscosity of the anode material decreases, the initial volume of the anode material 594 increases.

Preferably, the volume of the compartment 592 is selected based on the properties of the anode material 594. For example, one method of selecting the volume of a compartment 592 is to set a depth (Z-direction) of the compartment 592. Based on any width (Y-direction), the maximum height increase (X-direction) due to anode expansion is ascertained, based on the desired electrochemical operation (e.g., length of time, current density, etc.). Thus, to optimize the overall contact area (with respect to a cathode) of anode material, the height is selected which is preferably approximate to or slightly greater than the maximum height increase.

During initial usage of the anode structure 590 having anode material 594 therein, the area of ionic contact between the anode material and a cathode will generally be a function of the initial volume of the anode material (less the portions of the anode structure 590 not having compartments 592, i.e., the grids between the compartments 592). Over time, due to the expansion of the anode material that occurs during electrochemical reaction, the area of contact will accordingly increase. Referring now to FIG. 10C, the anode structure 590 includes a separator 596 attached thereto.

The structures may be dimensioned and configured according to the space constraints, power output, voltage requirements, etc. In one embodiment, a cell is provided having the configuration generally described with respect to FIGS. 1–6, wherein a cathode area of 28 cm$^2$ within a case having a length L of 45 mm, a width of 45 mm, and a thickness T of 8 mm is provided. The cathode area comprises the two major surfaces of the cathode, which are 35 mm by 40 mm. When a cathode capable of discharging at 100 mA/cm$^2$ is used, it is possible to attain 2.8 Amperes at 1 V for 2 hours with 1.1 mm thick anode per side.

Referring now to FIGS. 11–16, an embodiment of a cathode assembly 222 is depicted. Assembly 222 comprises a support structure 212 comprising a pair of ribs 252 and a center support 253, which assist in supporting a cathode 210. At one end 254 of assembly 222, a pair of inlet openings 256 are provided. Furthermore, at each side of assembly 222, an outlet opening 258 is provided. Therefore, in a preferred embodiment, air, partially scrubbed air, scrubbed air, substantially pure oxygen, or another oxidant has a flow through inlet openings 256 into channels 260 created by ribs 252. The channels 260 generally allow the oxidant to react at the cathode 210 and exit the assembly 222 via the outlet openings 258.

Referring now to FIGS. 17–21, an embodiment of a fuel cartridge 226 is depicted. Cartridge 226 comprises a frame 270 having a current collector 272 disposed around an anode or fuel portion 228. In a preferred embodiment, the current collector 272 comprises a copper or brass plate, and the fuel portion 228 comprises zinc or a zinc alloy integrally formed with an electrolyte. In a further preferred embodiment, the fuel portion is solid or substantially solid. The fuel cartridge 226 further includes openings 274 that correspond with openings 258 in the case 222.

Figure 27:
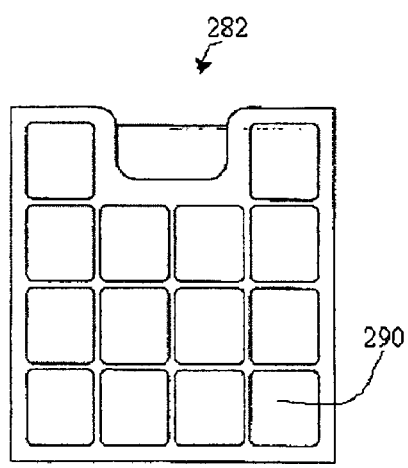
FIG. 27 is an end view of the cathode structure of FIG. 22.
Figure 26:
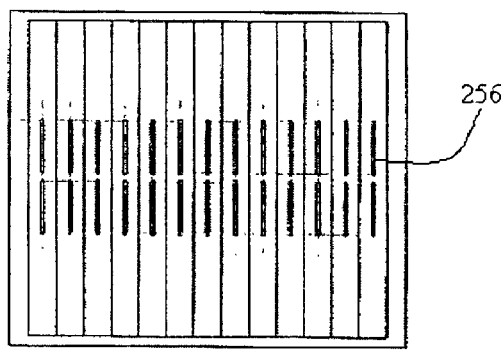
FIG. 26 is a bottom view of the cathode structure of FIG. 22.
Figure 28:
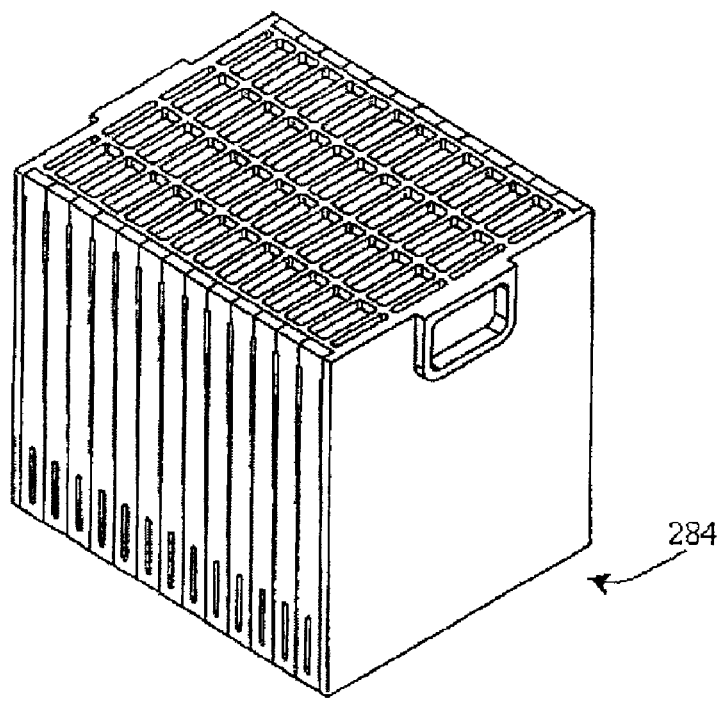
FIG. 28 is a top isometric view of an anode structure.
Figure 29:
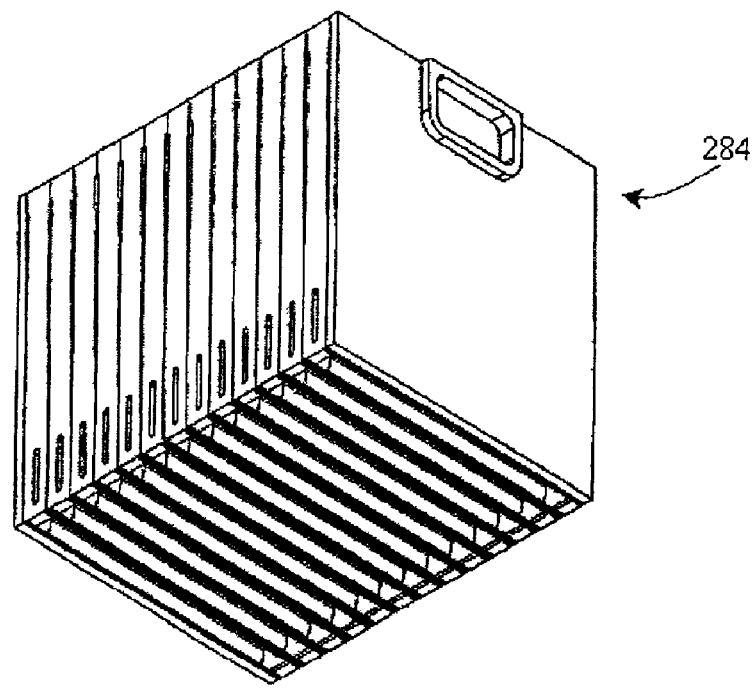
FIG. 29 is a bottom isometric view of the anode structure of FIG. 28.

Referring now to FIGS. 22–33, a metal air cell system 280 is depicted. The metal air system 280 comprises a cathode structure 282 (FIGS. 22–27) and an anode structure 284 (FIGS. 28–33). The cathode structure 282 generally comprises a plurality of cathode cases 222, such as those described above with respect to FIGS. 11–16, or alternative cathode cases, such as those described with respect to FIGS. 1–6 and FIGS. 7–10. The top of the cathode structure 282 (FIG. 24) is open and configured to allow the corresponding anode structure 284 to be inserted therein, whereby the complementary anodes and cathodes are in ionic contact. The sides of the cathode structure 282 (FIG. 25) comprise a plurality of ventilation openings 286 and outlet openings 288. The ventilation openings 286 provide ventilation fluid, such as ambient air, to cell components to remove heat. The outlet openings 288 are in fluid communication with the oxidant surfaces of the cathode 210, for example, via openings 274 in the fuel cartridge 226 and outlet openings 258 of the cathode case 222. Oxidant flows into the cathode 210 via the openings 256 in the cathode cases 222 (see FIG. 26). Optionally, to decrease mass while maintaining structural integrity, a plurality of cut out portions 290 are provided, for example on the ends of the cathode structure 282 (FIG. 27).

The anode structure 284 comprises a plurality of anodes in cartridges 226, such as those described above with respect to FIGS. 17–21, or alternative cathode cases, such as those described with respect to FIGS. 1–6 and FIGS. 7–10. Structure 284 includes handle portions 294, which complement openings on the ends of cathode structure 282. The top portion (FIG. 30) of the anode structure 284 comprises a plurality of ventilation openings 292.

It is understood that the components of the metal air cell 280, such as the cathode and anode structures 282 and 284, the fuel cartridge 226, the case 222, and other accompanying parts may be formed of any suitable material that is can impart the necessary structural integrity, and can withstand the electrochemical environment, including the electrolyte and the thermal limits. Suitable materials include, but are not limited to, acrylonitrile butadiene styrene polymer, polyvinyl chloride, epoxy glass, fluorocarbons, polycarbonate, the like, and combinations comprising at least one of the foregoing materials.

Figure 34:
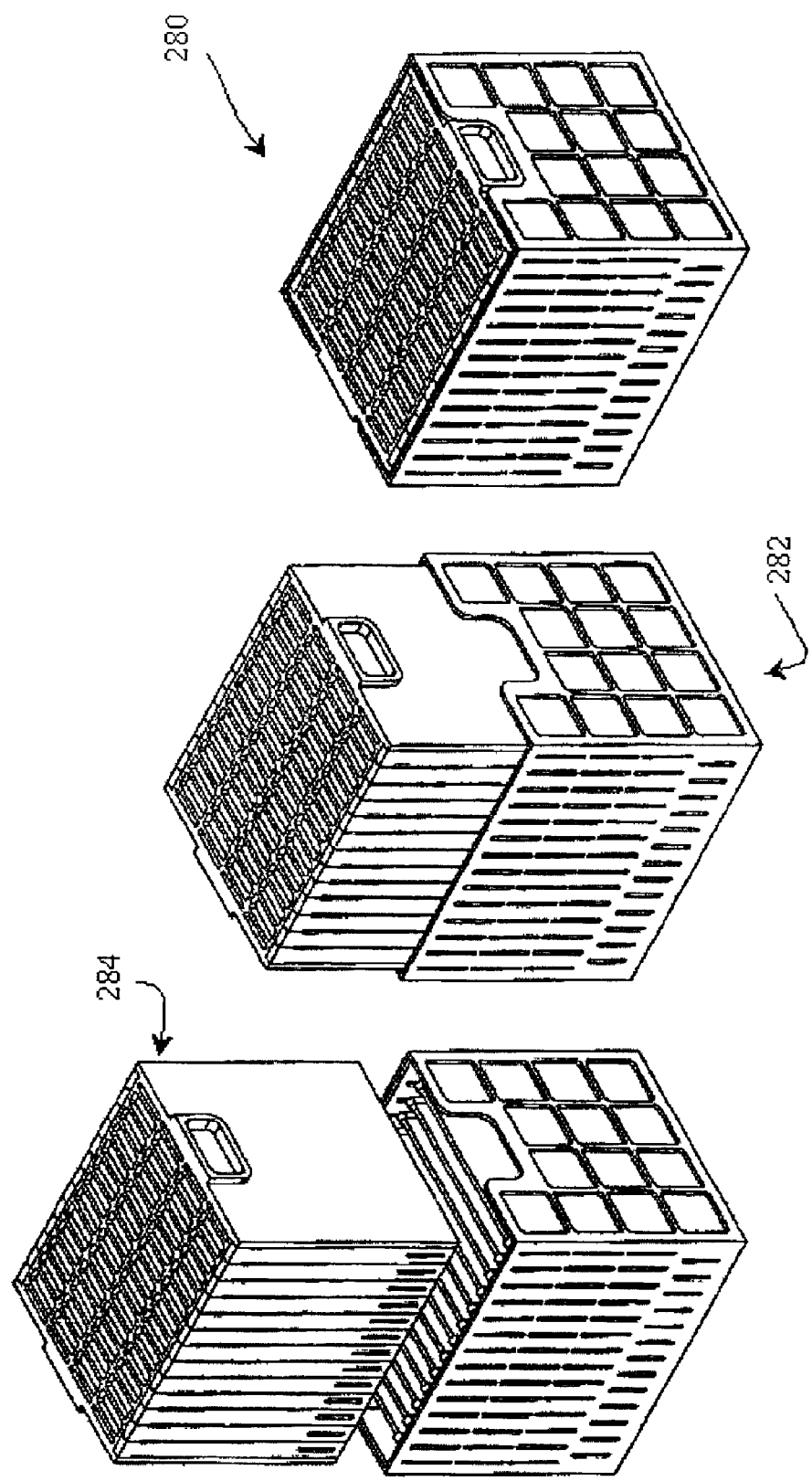
FIG. 34 is an isometric view of the assembly of a metal air cell from a cathode structure and an anode structure.

Referring now to FIG. 34, the cathode structure 282 and the anode structure 284 form a metal air cell 280. Preferably, the fit between the cathode structure 282 and the anode structure 284 is sufficiently tight to prevent unintentional separation of the structures of the cell. While the cell 280 is shown having the walls of the cathode structure 282 on the outside of the walls of the anode structure 284, the configuration may be reversed, wherein the walls of the anode structure 284 are on the outside of the walls of the cathode structure 282.

Therefore, when assembled, the fuel cartridges 226 of the metal air cell 280 are in fluid communication with a cooling fluid, such as air, generally through openings 292 and 286. For the oxidant, openings 256 allow for oxidant flow into the cathode cases 222. Openings 256 may be in fluid communication with an oxygen source or generation process, ambient air, or a combination of an oxygen source or process and ambient air. For example, a switchable manifold system, removable plenum, or other mechanical means may be used to switch between ambient air as the oxidant source and an oxygen source or process as the oxidant source. Spent oxidant may flow out via the outlet openings 288 of the cathode structure 282, openings 274 in the fuel cartridge 226, and outlet openings 258 of the cathode case 222.

Figure 35:
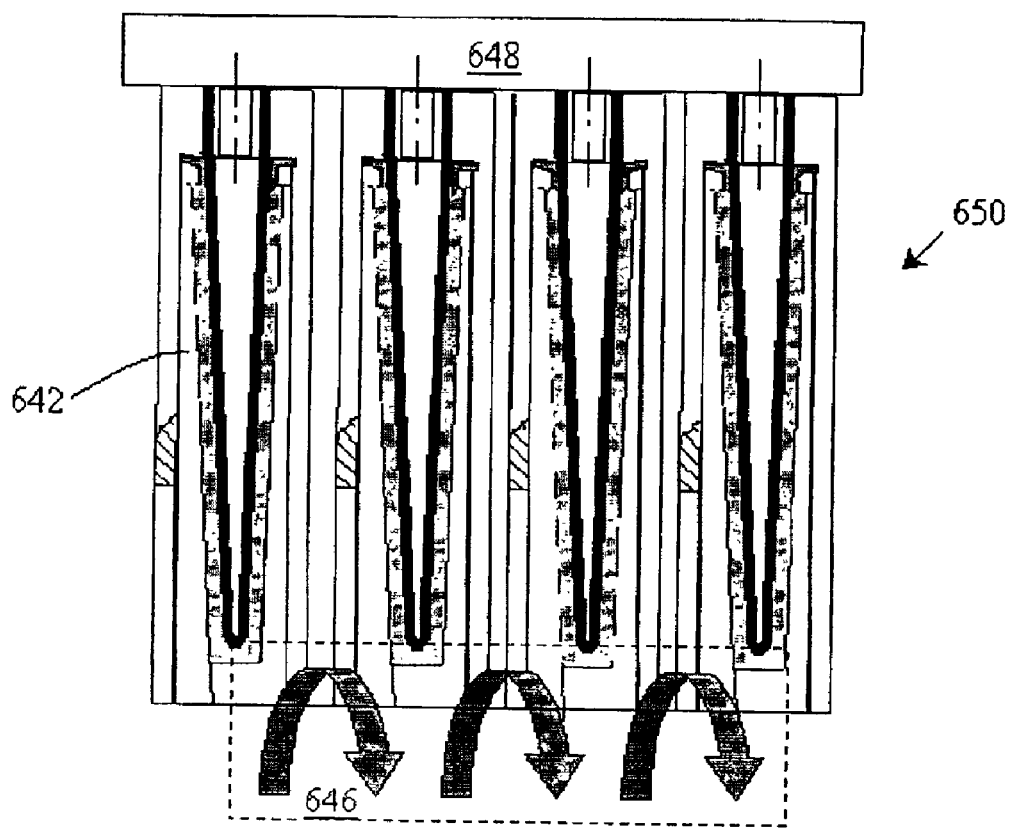
FIG. 35 is a schematic view of a cell system incorporating a fluid management system.

Referring now to FIG. 35, a plurality of metal air cells 642 are assembled to form a cell system 650. The cell system 650 comprises a cooling system 646 and an oxidant source 648. The cooling system 646 allows cooling fluid, typically ambient air, to flow through the cells to remove heat built up during the electrochemical process. The cooling system may be in the form of holes, slots, manifolds, ports, or other means to provide fluid communication between the cooling fluid and the anode portions 28 (see generally FIGS. 1–5). Generally, the cooling system allows the cell system 650 to operate at temperatures below 100° C., preferably below 60° C., and more preferably below 40° C.

The oxidant source 648 comprises a reservoir or a feed of oxidant to the cells 642. The oxidant source 648 may comprise sources such as a rigid or flexible chamber containing oxidant (fluid or solid), a structure or apparatus for fluid communication with ambient air (e.g., scrubbing systems), an oxidant generation source, or combinations comprising at least one of the foregoing sources. In one embodiment, the oxidant source 648 comprises a chamber, for example for containing a quantity of air or oxygen. The chamber may comprise a manifold for fluid communication with a source as described above. In a preferred embodiment, the oxidant source 648 comprises or is in fluid communication with a scrubbing system, for example to remove carbon dioxide and water from ambient air. This scrubbing system may be used at all times during the electrochemical process, or alternatively may be used intermittently. For example, for a sudden boost in current output, pure oxygen can be used at the cathode (referred to as an "oxygen boost"), which may increase the current density capabilities of the particular up to about four times that of the current density for the particular cathode using ambient air.

By splitting the cooling fluid and the oxidant, which in some cases may both be air, various advantages are achieved. Where air is used, the ratio of cooling fluid to oxidant may be greater than 20/1, 40/1, 60/1, or higher. If an oxygen boost is desired and the cooling fluid and oxidant supply are contiguous, then energy is wasted in the process of scrubbing cooling air. However, with the oxidant and thermal management system herein, inefficient scrubbing operations are minimized or eliminated.

Figure 36:
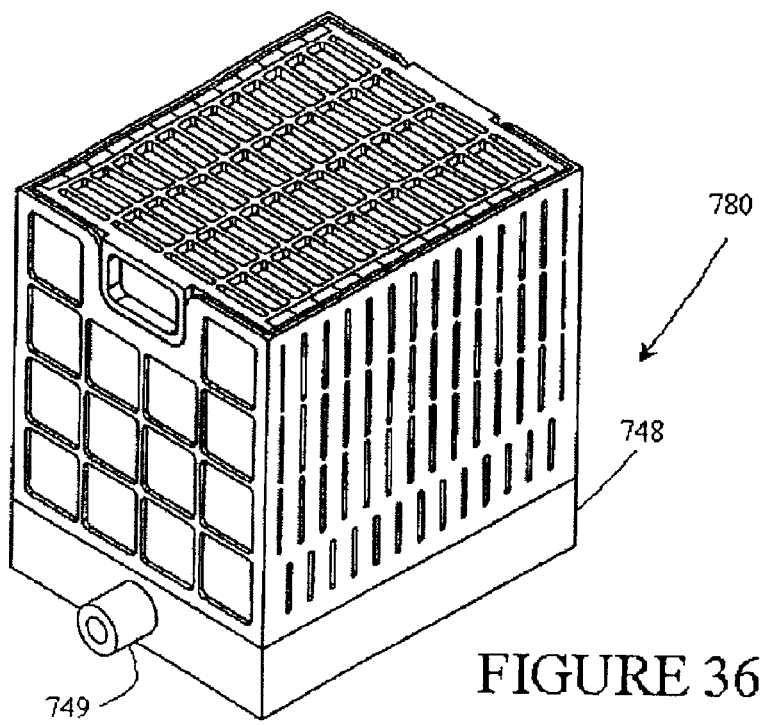
FIG. 36 is an isometric view of a metal air cell incorporating a fluid management system.
Figures 37, 38:
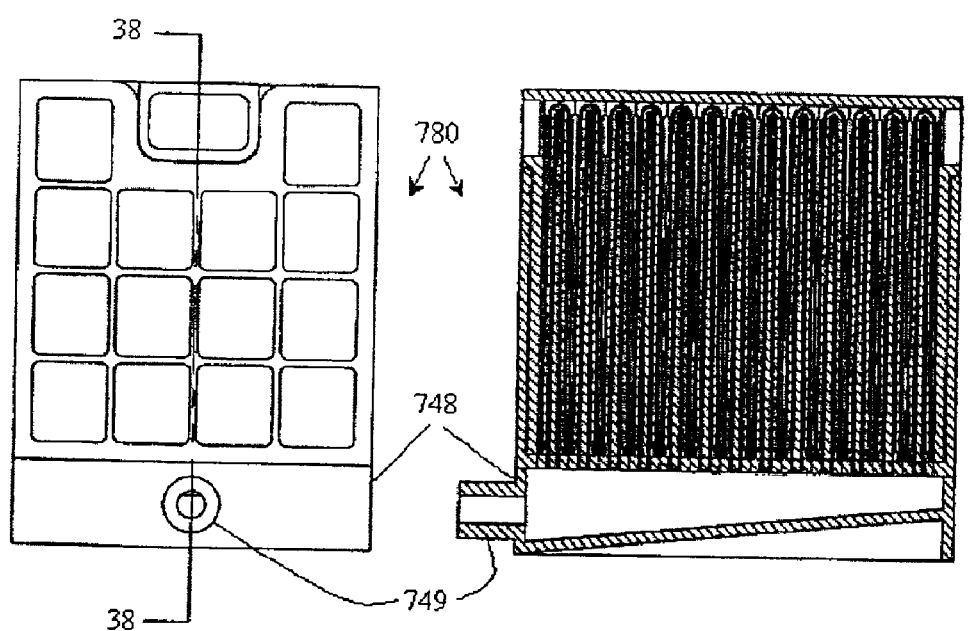
FIG. 37 is an end view of the metal air cell of FIG. 32.
FIG. 38 is a sectional view along lines 38—38 of FIG. 37.

Referring now to FIGS. 36–38, a metal air cell 780, which may be similar to cell 280 described above, is depicted having an oxidant chamber 748 attached to the bottom thereof. Thus, the bottom portion of the cathode structure, for example having openings such as openings 256 in the cathode case 222 (see FIGS. 13 and 23), is enveloped by the oxidant chamber 748. The oxidant chamber comprises a conduit 749 at one end thereof, which may be in fluid communication with an oxygen source or generation process, ambient air, or a combination of an oxygen source or process and ambient air. Alternatively, an additional conduit may be included, wherein, for example, one conduit is in fluid communication with ambient air and the other conduit is in fluid communication with an oxygen source. In a preferred embodiment, the oxidant chamber 748 is configured to maintain a constant velocity across the chamber. This may be accomplished with a sloped bottom portion, which spans the plurality of cathode cases. The sloped portion provides reduced cross sectional area of the chamber 748, which maintains the constant velocity as the oxidant is reacted at the cathode.

Figure 39:
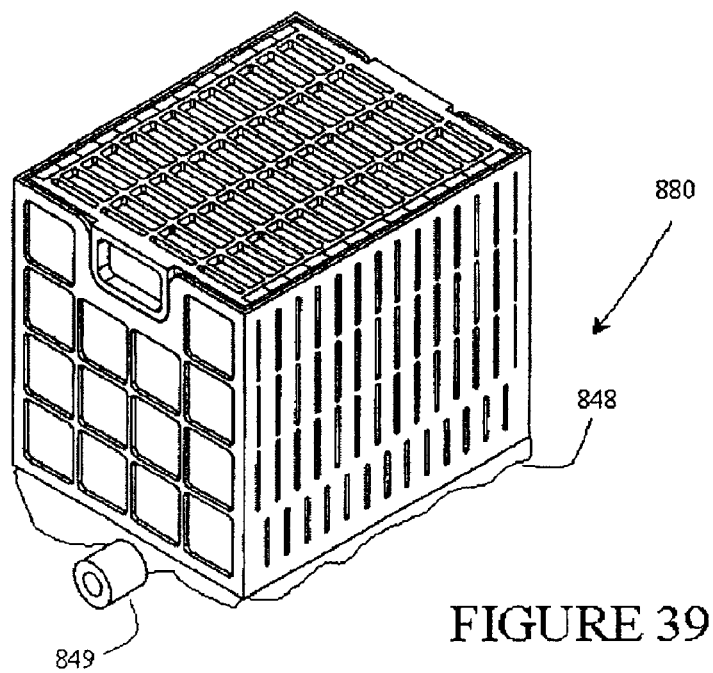
FIG. 39 is an isometric view of another metal air cell incorporating a fluid management system.
Figures 40, 41:
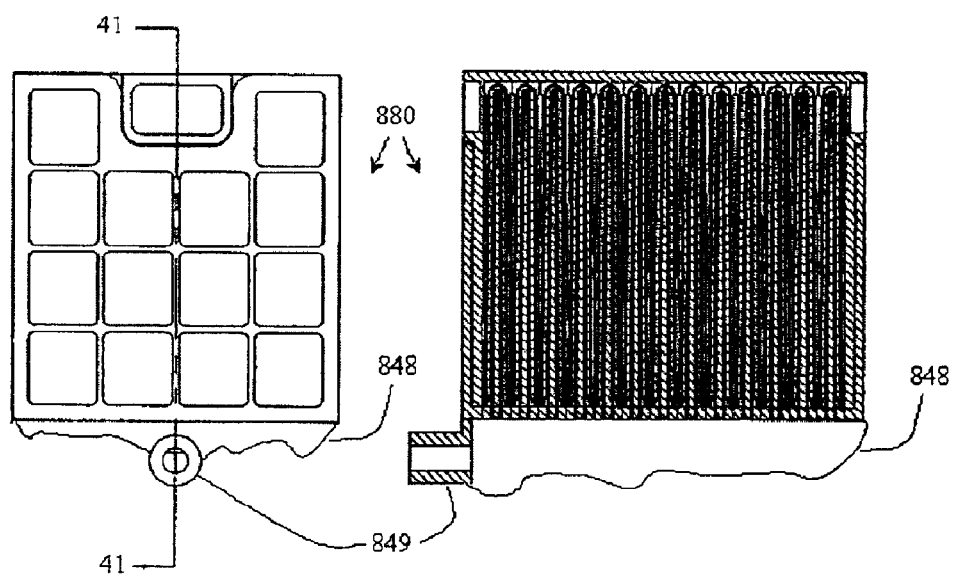
FIG. 40 is an end view of the metal air cell of FIG. 39.
FIG. 41 is a sectional view along lines 41—41 of FIG. 39.

Referring now to FIGS. 39–41, a metal air cell 880, which may be similar to cell 280 described above, is depicted having an oxidant chamber 848 attached to the bottom thereof. Thus, the bottom portion of the cathode structure, for example having openings such as openings 256 in the cathode case 222 (see FIGS. 13 and 23), is enveloped by the oxidant chamber 848. The oxidant chamber comprises a conduit 849 at one end thereof, which may be in fluid communication with an oxygen source or generation process, ambient air, or a combination of an oxygen source or process and ambient air. The oxidant chamber 848 comprises a flexible material and is configured to allow for expansion thereof in accordance with the oxidant supply thereto. Therefore, when a feed to oxidant chamber 848 is changed, the volume of the chamber 848 can contract or expand as needed. Alternatively, an additional conduit may be included, wherein, for example, one conduit is in fluid communication with ambient air and the other conduit is in fluid communication with an oxygen source.

Figure 42A:
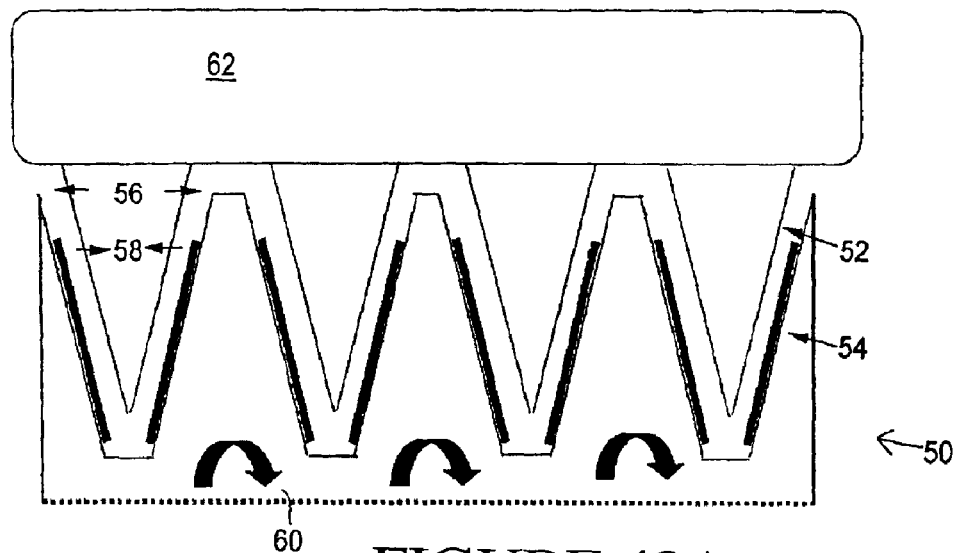
FIGS. 42A–42C are schematic diagrams of a metal air electrochemical cell system including a pressure control system for contact enhancement of the electrodes.

Referring now to FIG. 42A, a metal air electrochemical cell system 650 is schematically depicted. The electrochemical cell system 650 includes a plurality of cathode structures 52 and one or more corresponding anode structures 54. The cathode structures 52 generally include electrode areas, such as air diffusion electrode material or other suitable cathode materials, as described further herein. Further, the cathode structures 52 or configured to expand and contract, schematically represented by arrows 56 and 58, respectively. The anode structures 54 includes suitable supporting structures corresponding with the cathode structures 52, and metal fuel anode regions corresponding with the cathode regions of the cathode structures 52.

Electrochemical cell system 650 further includes a cooling system 60 and an oxygen source 62. The cooling system 60 and the oxidant source 62 may be the same or different. In one preferred embodiment, the cooling system 60 and the oxidant source 62 are separate, as described above. The cooling system 60 may be in the form of holes, slots, baffles, ports, or other means to provide fluid communication between the cooling fluid and the anode structures 54, generally to remove heat generated by the electrochemical reaction in the system 50. Generally, the cooling system 60 allows the cell system 50 to operate at temperatures below 100° C., preferably below 60° C., and more preferably below 40° C.

By maintaining the pressure within the oxidant source 62, which it is in fluid communication with the electrode(s) within the cathode structure 52, the force provided between the cathode and the anode may remain constant, regardless of anode expansion. Therefore, as described further herein, upon anode expansion, the pressure at the interface of the anode and cathode will increase. Accordingly, to compensate for this increase, the pressure within the oxidant source 62 may correspondingly decrease, for example, with appropriate pressure release mechanism preferably to maintain a constant pressure at the interface of the anode and cathode. Furthermore, after the metal fuel has been fully consumed, and it becomes desirable to replace the metal fuel therein, or to replace the entire anode structure 54, the pressure control system herein facilitates easy removal of the cathode structures 52. By releasing the pressure within the oxidant source 62, the cathode structures 52 may accordingly contract, allowing for physical contact between the anode and cathodes to be released. This system is particularly suitable, for example, for use in the electrochemical cells described in U.S. Provisional Patent Application Ser. No. 60/290,945, entitled "Metal Air Cell Incorporating Reaction Rate Control Systems" by Sadeg M. Faris filed on May 14, 2001 (EL608424713US).

Figure 42B:
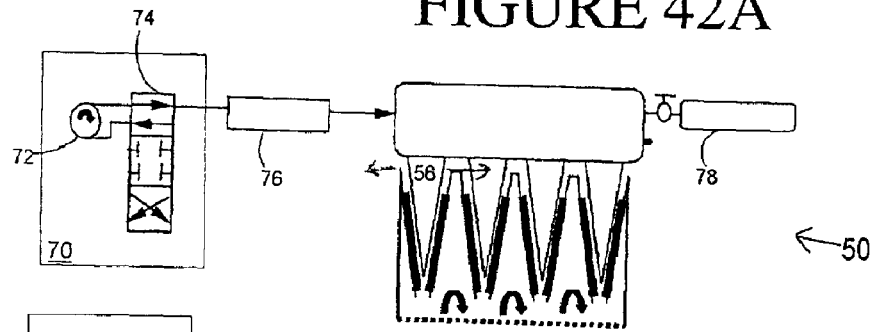

Referring now to FIG. 42B, the electrochemical cell system 650 is depicted with a pressurizing and/or depressurizing system 70. The pressurizing and/or depressurizing system may include any suitable mechanical apparatus, such as pumps, valves, piping, and other suitable apparatus. Further, the pressurizing and/or depressurizing system 70 may include active (e.g., in conjunction with a processor) or passive (e.g., in mechanical cooperation with one or more mechanical apparatus of the pressurizing and/or depressurizing system) sensors, for example, to sense pressure, heat, volume expansion (e.g., by way of displacement sensors), or any other desired parameter.

Figure 42C:
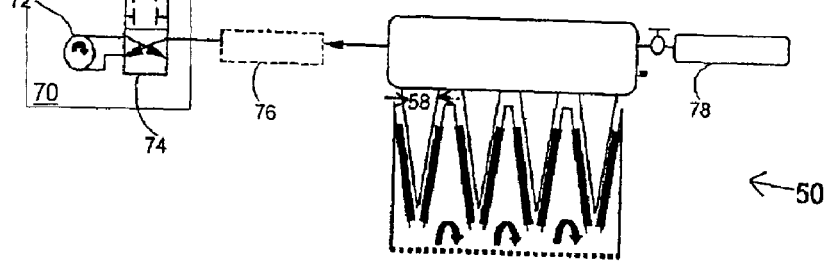

In one embodiment, and as illustrated in FIGS. 42B and 42C, the pressurizing and/or depressurizing system 70 includes a pump 72 and a valve 74. As depicted in FIG. 42B, the pressurizing and/or depressurizing system 70 is configured to provide pressure to the oxidant source 62. This pressure is in the form of air, which is preferably scrubbed through a scrubber 76. This air will be used as the oxidant for the active surfaces of the electrodes in the cathode structure 52. Upon application of pressure from the pressurizing and/or depressurizing system 70, the cathode structures 52 expand as indicated by arrows 56 due to the force of the oxidant introduce into the cathode structures. In this mode of operation, the cathode structures 52 will expand so as to provide a suitable interface between the electrodes. Preferably, this interface is maintained at a uniform pressure once the system has attained suitable electrochemical equilibrium. In an alternative embodiment, an oxygen source 78 is provided, which may selectively provide oxygen through the oxidant source 62 for an oxygen boost as described above.

Referring now to FIG. 42C, the pressurizing and/or depressurizing system 70 is operated in depressurizing mode. In this embodiment, air may be removed from the oxidant chamber 62, generally to depressurize the oxygen source 62. This mode of operation may be utilized under various circumstances, including: the increase of pressure at the interface between the electrodes due to change in ambient conditions; increase in pressure at the interface of electrodes due to anode expansion; selectively reducing the current and/or voltage provided from the cells system 50; and/or contracting the cathode structures 52 to facilitate removal from the anode structure 54.

In an alternative embodiment, a check valve 80 may be incorporated within or upon the oxidant source 62. The check valve 80 may be used for pressure release within the oxidant source 62 for any of the purposes above for the depressurizing mode. The check valve 80 may be used in conjunction with the pressurizing and/or depressurizing system 70 as described above, or alternatively may be the only means of pressure release within the oxidant source 62.

In a further embodiment, the system 650 may include one or more sensors (not shown) to determine the pressure or other parameter within the oxidant chamber 62. For example, where the primary cause for pressure increase at the interface of the anode and the cathode is the expansion of the anode, a known pressure increase may be used to determine the amount of anode expansion. The quantity of anode expansion, in turn, may be used to ascertain or estimate the quantity of energy and/or current remaining in the anode, based on known characteristics of the anode. Alternatively, one or more displacement sensors may be employed within the cathode structure, which may be used to estimate the anode expansion.

Various benefits are derived from the metal air cell and the components described herein. The fuel cartridges are contained, and in certain embodiments wherein the electrolyte is provided within the fuel cartridge, the electrolyte is also contained. The electrolyte is further contained in embodiments where the electrolyte is formed integrally with the anode. Furthermore, where the seal is used at the end of the fuel cartridge, contamination of the electrolyte and electrolyte leakage are virtually eliminated. Additionally, the fuel cartridge has a longer shelf life since the electrolyte does not dry out. Further, where an electrolyte or fluid is disposed in a chamber within the fuel cartridge, generally as described with respect to FIGS. 7–10, the shelf life is additionally enhanced, and also extra electrolyte is provided which may improve the interface between the cathode and the anode.

An additional benefit is derived from the shape of the anode and cathode structures. The angled shape, preferably in the form of a wedge having substantially symmetrical major surfaces (i.e., of the cathode, wherein the major surfaces are facing outwardly, and of the anode, wherein the major surfaces are facing inwardly), provides substantially uniform contact between the cathode and anode. This reduces the internal resistance of the cell, and allows for substantially uniform consumption of the fuel, which consequently increases the life of the cell, as well as the power output and depth of discharge. The shape further protects the cell structure to prolong the lifetime of the cell, particularly since the cathodes will not scratched or otherwise damaged by the fuel cartridge during the loading and unloading processes due to the wedge shape design.

A further benefit of the metal air cell herein resides in the inherent safety of the design. The spent fuel cartridges are safe to dispose, and it is easy to recycle the used fuel. For example, the spent fuel may be recharged in a reverse process, wherein a voltage is applied to convert the metal oxide into metal. In embodiments where a plurality of cells are assembled together, for example as described with respect to FIG. 11, the packaging allows for easy refueling while minimizing or eliminating potential contamination of the user.

Various benefits are derived from the metal air cell and the fluid management system described herein. For example, for selective oxygen boost, the present system is readily configured for multiple oxidant sources such as ambient air and an oxygen source or process. This allows for efficient operation, since a scrubber or other oxygen purification scheme may be selectively operated. Further, inefficiencies associated with cooling the cell with scrubbed air are removed, since the cell may be ventilated with separate fluid or air that the fluid or air used as the oxidant.

The use of pure oxygen also has benefits associated with the cell operation. Particularly, cathode current density performance may be greatly increased. Typical increases are on the magnitude of a fourfold improvement in current density. Therefore, another embodiment employs substantially pure oxygen as the oxidant, thereby greatly minimizing the system volume and mass while maintaining the same power output.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A metal air cell comprising:
   a cathode having a pair of oxidant sides and anode sides;
   a cartridge having a pair of inside surfaces for housing an anode, the anode provided in two parts, each part having a side complementary each anode side of the cathode, the cartridge further comprising a reservoir at an end opposite an insertion end, the reservoir having electrolyte or liquid therein; and
   a separator between the anode and cathode to electrically isolate the anode and the cathode,
   wherein an electrolyte is disposed between the cathode and the anode, the electrolyte provided within the anode, separately at the interface between the cathode and the anode, or both within the anode and separately at the interface between the cathode and the anode.

2. The metal air cell as in claim 1, wherein the cathode is within a structure, the structure having a portion complementing the reservoir, such that when the cathode and the anode are brought into ionic communication the electrolyte or liquid within the reservoir is spread to the interface between the anode and the cathode.

3. The metal air cell as in claim 1, wherein the cathode is supported on a frame.

4. The metal air cell as in claim 3, wherein the frame is configured to provide a conduit in fluid communication with the pair of oxidant sides of the cathode.

5. The metal air cell as in claim 1, wherein oxidant is provided to the cathode separate from cooling air.

6. The metal air cell as in claim 1, wherein separator is adhered to the cathode.

7. The metal air cell as in claim 1, wherein separator is adhered to the anode.

8. A metal air cell comprising:
   a cathode having an oxidant surface and an anode surface, the cathode being supported on a frame configured to provide a conduit in fluid communication with the oxidant surface;
   an anode complementary the cathode's anode surface; and
   a separator between the anode and cathode to electrically isolate the anode and the cathode,
   wherein an electrolyte is disposed between the cathode and the anode, the electrolyte provided within the anode, separately at the interface between the cathode and the anode, or both within the anode and separately at the interface between the cathode and the anode.

9. The metal air cell as in claim 8, wherein the anode is supported by two inside surfaces of a cartridge.

10. The metal air cell as in claim 9, the cartridge further comprising a reservoir at an end opposite an insertion end, the reservoir having electrolyte or liquid therein.

11. The metal air cell as in claim 10, wherein the cathode is within a structure, the structure having a portion complementing the reservoir, such that when the cathode and the anode are brought into ionic communication the electrolyte or liquid within the reservoir is spread to the interface between the anode and the cathode.

12. The metal air cell as in claim 8, wherein oxidant is provided to the cathode separate from cooling air.

13. The metal air cell as in claim 8, wherein separator is adhered to the cathode.

14. The metal air cell as in claim 8, wherein separator is adhered to the anode.

* * * * *